US010980237B2

(12) United States Patent
Hixson et al.

(10) Patent No.: US 10,980,237 B2
(45) Date of Patent: Apr. 20, 2021

(54) COMPOSITIONS CONTAINING IDENTICAL POLYAMINE SALTS OF MIXED ANIONIC PESTICIDES

(75) Inventors: Adam Hixson, Raleigh, NC (US); Steven Bowe, Apex, NC (US); Wen Xu, Cary, NC (US)

(73) Assignee: BASF SE, Ludwigshafen (DE)

( * ) Notice: Subject to any disclaimer, the term of this patent is extended or adjusted under 35 U.S.C. 154(b) by 707 days.

(21) Appl. No.: 13/883,379

(22) PCT Filed: Nov. 2, 2011

(86) PCT No.: PCT/EP2011/069200
§ 371 (c)(1),
(2), (4) Date: May 3, 2013

(87) PCT Pub. No.: WO2012/059494
PCT Pub. Date: May 10, 2012

(65) Prior Publication Data
US 2013/0225405 A1 Aug. 29, 2013

Related U.S. Application Data

(60) Provisional application No. 61/410,360, filed on Nov. 5, 2010.

(30) Foreign Application Priority Data

Dec. 1, 2010 (EP) .................................... 10193343

(51) Int. Cl.
*A01N 57/20* (2006.01)
*A01N 37/10* (2006.01)
*A01N 25/02* (2006.01)

(52) U.S. Cl.
CPC ............. *A01N 57/20* (2013.01); *A01N 25/02* (2013.01); *A01N 37/10* (2013.01)

(58) Field of Classification Search
CPC ........ A01N 57/20; A01N 57/12; A01N 37/10; A01N 37/40; A01N 25/02; A01N 2300/00
See application file for complete search history.

(56) References Cited

U.S. PATENT DOCUMENTS

| | | | |
|---|---|---|---|
| 3,683,010 A | 8/1972 | Reck et al. | |
| 3,852,340 A * | 12/1974 | Reck et al. | 562/472 |
| 4,405,531 A | 9/1983 | Franz | |
| 5,035,738 A | 7/1991 | Burns et al. | |
| 5,175,353 A | 12/1992 | Jones et al. | |
| 5,221,791 A | 6/1993 | Narayanan et al. | |
| 6,133,199 A * | 10/2000 | Soula | A01N 25/04 504/206 |
| 8,987,167 B2 * | 3/2015 | Xu | A01N 37/40 504/100 |
| 2003/0096708 A1 * | 5/2003 | Agbaje | A01N 25/30 504/365 |
| 2004/0097372 A1 | 5/2004 | Abraham et al. | |
| 2007/0082818 A1 * | 4/2007 | Perry | A01N 33/04 504/102 |
| 2008/0207452 A1 * | 8/2008 | Kramer | A01N 25/02 504/127 |
| 2010/0273654 A1 | 10/2010 | Li et al. | |

FOREIGN PATENT DOCUMENTS

| | | | |
|---|---|---|---|
| CA | 936865 | 11/1973 | |
| CA | 2008553 | 7/1990 | |
| EP | 0 183 384 | 6/1986 | |
| EP | 0 375 624 | 6/1990 | |
| EP | 0 379 624 | 8/1990 | |
| GB | 1078804 | 8/1967 | |
| WO | WO 91/04661 | 4/1991 | |
| WO | WO 97/24931 | 7/1997 | |
| WO | WO 03/101197 A1 * | 12/2003 | |
| WO | WO-2008048964 A2 * | 4/2008 | ............ A01N 57/20 |
| WO | WO 2009/068226 | 6/2009 | |
| WO | WO-2010151622 A2 * | 12/2010 | ............ A01N 57/20 |
| WO | WO 2011039172 | 4/2011 | |

OTHER PUBLICATIONS

Office Action, issued in co-assigned U.S. Appl. No. 13/498,779, dated Jun. 23, 2014.
Office Action, issued in co-assigned U.S. Appl. No. 13/498,779, dated Oct. 16, 2013.
Behrens et al., "Dicamba Volatility," Weed Science, vol. 27, No. 5, (1979), pp. 486-493.
Schubert et al., "Adjuvants and Volatility of Hormone Herbicides," Pestic. Sci., vol. 38, (1993), pp. 179-183.
International Search Report, PCT/EP2011/069200, filed Nov. 2, 2011.
International Preliminary Report on Patentability, PCT/EP2011/069200, filed Nov. 2, 2011.
Office Action dated Aug. 9, 2016 in U.S. Appl. No. 14/626,189, filed Feb. 19, 2015.

* cited by examiner

*Primary Examiner* — Abigail Vanhorn
*Assistant Examiner* — Mei Ping Chui
(74) *Attorney, Agent, or Firm* — Marshall, Gerstein & Borun LLP

(57) ABSTRACT

The present invention relates to a composition comprising a first salt, which contains a first anionic pesticide (A1) and a cationic polyamine (B), and a second salt, which contains a second anionic pesticide (A2) and a cationic polyamine (B), wherein both salts contain the same cationic polyamine (B), and wherein the cationic polyamine comprises at least two amino groups. The disclosure further relates to methods for preparing the composition, methods for combatting harmful insects and/or phytopathogenic fungi using the composition, methods for controlling undesired vegetation using the composition, and seeds including the composition.

9 Claims, No Drawings

COMPOSITIONS CONTAINING IDENTICAL POLYAMINE SALTS OF MIXED ANIONIC PESTICIDES

This application is a National Stage application of International Application No. PCT/EP2011/069200, filed Nov. 2, 2011, which claims the benefit of U.S. Provisional Application No. 61/410,360, filed Nov. 5, 2010. This application also claims priority under 35 U.S.C. § 119 to European Patent Application No. 10193343.0, filed Dec. 1, 2010.

The present invention relates to a composition comprising a first salt, which contains a first anionic pesticide (A1) and a cationic polyamine (B), and a second salt, which contains a second anionic pesticide (A2) and a cationic polyamine (B), wherein both salts contain the same cationic polyamine (B), and wherein the cationic polyamine comprises at least two amino groups. It further relates to a method for preparing said comprising the step of contacting the first salt and the second salt. In addition, the invention relates to a method of combating harmful insects and/or phytopathogenic fungi, which comprises contacting plants, seed, soil or habitat of plants in or on which the harmful insects and/or phytopathogenic fungi are growing or may grow, plants, seed or soil to be protected from attack or infestation by said harmful insects and/or phytopathogenic fungi with an effective amount of said composition. It also relates to a method of controlling undesired vegetation, which comprises allowing a herbicidal effective amount of said composition to act on plants, their habitat or on seed of said plants. Finally, the invention relates to seed comprising said composition. The preferred embodiments of the invention mentioned herein below have to be understood as being preferred either independently from each other or in combination with one another.

There are various pesticides which have a rather high volatility, such as free acid forms of carboxylic acid containing pesticides like dicamba or 2,4-D. Such volatile pesticides are subject to a higher degree of drift, which could cause damage to sensitive off-target crops (e.g. soybeans) in nearby fields. They are also less effective on target pests, since a large part of the pesticide evaporates. To avoid these problems, low volatile pesticides are desirable. These problems occur not only in formulations of single pesticides, but are also relevant in formulations comprising at least two pesticides.

Various salts of anionic pesticides are known comprising cationic, amino-functionalized compounds:

U.S. Pat. No. 4,405,531 and WO 97/24931 disclose various organic salts of glyphosate, for examples salts prepared from ethylenediamine, diethylenetriamine, propylenediamine, phenylenediamine or piperidine.

EP 0 183 384 discloses a low volatility salt of dicamba, namely the 2-(2-aminoethoxy)ethanol salt.

U.S. Pat. No. 5,221,791 discloses aminoalkylpyrrolidone salts of pesticides comprising an acidic hydrogen, such as dicamba.

EP 0 375 624 discloses low volatility amine salts of pesticides, wherein the amine is for example an aminopropylmorpholine, Jeffamine® D-230, or 2,4,6-tris(dimethylaminomethyl)phenol.

The pending European patent application No. 09173368.3 discloses salts comprising an anionic pesticide and various cationic polyamines.

These amino salts of anionic pesticides are associated with various disadvantages: The starting materials have a rather low boiling point which makes them difficult to handle (such as ethylenediamine Fp 117° C.). Although these pesticide salts have already a lowered volatility compared to the free acid forms of the pesticide, this residual volatility was still too high. Further problems are that some salts have only reduced pesticidal activity, that they are too expensive, and/or that they have a low solubility in water. These problems occur especially for mixtures of different pesticides, such as mixtures of different anionic pesticides.

Object of the present invention was to find a composition of at least two anionic pesticides, which show a low volatility. These compositions should be easily to prepare starting from cheap, industrially available compounds, which are easy to handle. Another object was that the pesticidal activity remains at a level equivalent to known compositions comprising said pesticides. Yet another object was to find composition, which allow a high concentration of the pesticides in said composition.

The object was solved by a composition comprising
a) a first salt, which contains a first anionic pesticide (A1) and a cationic polyamine (B), and
b) a second salt, which contains a second anionic pesticide (A2) and a cationic polyamine (B), wherein both salts contain the same cationic polyamine (B), and wherein the cationic polyamine comprises at least two amino groups.

The term "salt" refers to chemical compounds, which comprise at least one anion and at least one cation. The ratio of anions to cations usually depends on the electric charge of the ions and will result in neutral salts. Typically, salts dissociate in anions and cations when dissolved in water.

The term "pesticide" within the meaning of the invention states that one or more compounds can be selected from the group consisting of fungicides, insecticides, nematicides, herbicide and/or safener or growth regulator, preferably from the group consisting of fungicides, insecticides or herbicides, most preferably from the group consisting of herbicides. Also mixtures of pesticides of two or more the aforementioned classes can be used. The skilled artisan is familiar with such pesticides, which can be, for example, found in the Pesticide Manual, 15th Ed. (2009), The British Crop Protection Council, London.

The first anionic pesticide and the second anionic pesticide may be selected from anionic pesticides. The first and the second anionic pesticide refer to different anionic pesticides. Additional anionic pesticides may be present in the composition. Preferably, the first and the second anionic pesticide (A1) and (A2) are the only anionic pesticides present in the composition.

The term "anionic pesticide" refers to a pesticide, which is present as an anion. Preferably, anionic pesticides relate to pesticides comprising a protonizable hydrogen. More preferably, anionic pesticides relate to pesticides comprising a carboxylic, thiocarbonic, sulfonic, sulfinic, thiosulfonic or phosphorous acid group, especially a carboxylic acid group. The aforementioned groups may be partly present in neutral form including the protonizable hydrogen.

Usually, anions such as anionic pesticides comprise at least one anionic group. Preferably, the anionic pesticide comprises one or two anionic groups. In particular the anionic pesticide comprises exactly one anionic group. An example of an anionic group is a carboxylate group (—C(O)O⁻). The aforementioned anionic groups may be partly present in neutral form including the protonizable hydrogen. For example, the carboxylate group may be present partly in neutral form of carboxylic acid (—C(O)OH). This is preferably the case in aqueous compositions, in which an equilibrium of carboxylate and carboxylic acid may be present. Usually, anions such as anionic pesticides may comprise a cationic group (e.g. an ammonium group) in addition to the anionic group. The number of anionic groups should be higher than the number of cationic groups in order to ensure that the anionic pesticide can form a salt with the cationic polyamine (B).

Suitable anionic pesticides are given in the following. In case the names refer to a neutral form or a salt of the anionic pesticide, the anionic form of the anionic pesticides are meant. For example, the anionic form of dicamba may be represented by the following formula:

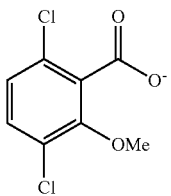 [SMILES: COc1c(Cl)ccc(Cl)c1C(=O)[O-]]

As another example, the anionic form of glyphosate may be represented by at least one of the following formulae:

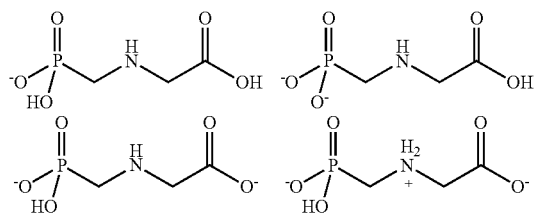

It is known to an expert, that the dissociation of the functional groups and thus the location of the anionic charge may depend for example on the pH, when the anionic pesticides is present in dissolved form. The acid dissociation contants $pK_a$ of glyphosate are typically 0.8 for the first phosphonic acid, 2.3 for the carboxylic acid, 6.0 for the second phosphonic acid, and 11.0 for the amine.

Suitable anionic pesticides are herbicides, which comprise a carboxylic, thiocarbonic, sulfonic, sulfinic, thiosulfonic or phosphorous acid group, especially a carboxylic acid group. Examples are aromatic acid herbicides, phenoxycarboxylic acid herbicides or organophosphorus herbicides comprising a carboxylic acid group.

Suitable aromatic acid herbicides are benzoic acid herbicides, such as diflufenzopyr, naptalam, chloramben, dicamba, 2,3,6-trichlorobenzoic acid (2,3,6-TBA), tricamba; pyrimidinyloxybenzoic acid herbicides, such as bispyribac, pyriminobac; pyrimidinylthiobenzoic acid herbicides, such as pyrithiobac; phthalic acid herbicides, such as chlorthal; picolinic acid herbicides, such as aminopyralid, clopyralid, picloram; quinolinecarboxylic acid herbicides, such as quinclorac, quinmerac; or other aromatic acid herbicides, such as aminocyclopyrachlor. Preferred are benzoic acid herbicides, especially dicamba.

Suitable phenoxycarboxylic acid herbicides are phenoxyacetic herbicides, such as 4-chlorophenoxyacetic acid (4-CPA), (2,4-dichlorophenoxy)acetic acid (2,4-D), (3,4-dichlorophenoxy)acetic acid (3,4-DA), MCPA (4-(4-chloro-o-tolyloxy)butyric acid), MCPA-thioethyl, (2,4,5-trichlorophenoxy)acetic acid (2,4,5-T); phenoxybutyric herbicides, such as 4-CPB, 4-(2,4-dichlorophenoxy)butyric acid (2,4-DB), 4-(3,4-dichlorophenoxy)butyric acid (3,4-DB), 4-(4-chloro-o-tolyloxy)butyric acid (MCPB), 4-(2,4,5-trichlorophenoxy)butyric acid (2,4,5-TB); phenoxypropionic herbicides, such as cloprop, 2-(4-chlorophenoxy)propanoic acid (4-CPP), dichlorprop, dichlorprop-P, 4-(3,4-dichlorophenoxy)butyric acid (3,4-DP), fenoprop, mecoprop, mecoprop-P; aryloxyphenoxypropionic herbicides, such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P, trifop. Preferred are phenoxyacetic herbicides, especially MCPA.

Suitable organophosphorus herbicides comprising a carboxylic acid group are bialafos, glufosinate, glufosinate-P, glyphosate. Preferred is glyphosate.

Suitable other herbicides comprising a carboxylic acid are pyridine herbicides comprising a carboxylic acid, such as fluoroxypyr, triclopyr; triazolopyrimidine herbicides comprising a carboxylic acid, such as cloransulam; pyrimidinylsulfonylurea herbicides comprising a carboxylic acid, such as bensulfuron, chlorimuron, foramsulfuron, halosulfuron, mesosulfuron, primisulfuron, sulfometuron; imidazolinone herbicides, such as imazamethabenz, imazamethabenz, imazamox, imazapic, imazapyr, imazaquin and imazethapyr; triazolinone herbicides such as flucarbazone, propoxycarbazone and thiencarbazone; aromatic herbicides such as acifluorfen, bifenox, carfentrazone, flufenpyr, flumiclorac, fluoroglycofen, fluthiacet, lactofen, pyraflufen. Further on, chlorflurenol, dalapon, endothal, flamprop, flamprop-M, flupropanate, flurenol, oleic acid, pelargonic acid, TCA may be mentioned as other herbicides comprising a carboxylic acid.

Suitable anionic pesticides are fungicides, which comprise a carboxylic, thiocarbonic, sulfonic, sulfinic, thiosulfonic or phosphorous acid group, espcecially a carboxylic acid group. Examples are polyoxin fungicides, such as polyoxorim.

Suitable anionic pesticides are insecticides, which comprise a carboxylic, thiocarbonic, sulfonic, sulfinic, thiosulfonic or phosphorous acid group, espcecially a carboxylic acid group. Examples are thuringiensin.

Suitable anionic pesticides are plant growth regulator, which comprise a carboxylic, thiocarbonic, sulfonic, sulfinic, thiosulfonic or phosphorous acid group, especially a carboxylic acid group. Examples are 1-naphthylacetic acid, (2-naphthyloxy)acetic acid, indol-3-ylacetic acid, 4-indol-3-ylbutyric acid, glyphosine, jasmonic acid, 2,3,5-triiodobenzoic acid, prohexadione, trinexapac, preferably prohexadione and trinexapac.

Preferred anionic pesticides are anionic herbicides, more preferably dicamba, glyphosate, 2,4-D, aminopyralid, aminocyclopyrachlor and MCPA. Especially preferred are dicamba and glyphosate. In another preferred embodiment, dicamba is preferred. In another preferred embodiment, 2,4-D is preferred. In another preferred embodiment, glyphosate is preferred. In another preferred embodiment, MCPA is preferred.

In a preferred embodiment the first anionic pesticide (A1) is a anionic pesticide wherein all anionic groups are selected from one or more carboxylate groups (pesticide A1). More preferably, the first anionic pesticide comprises one anionic group, which is a carboxylate group, or it comprises two anionic groups, which are both carboxylate groups. In particular, the anionic pesticide comprises exactly one anionic group, which is a carboxylate group.

When all anionic groups of the first anionic pesticide are selected from one or more carboxylate groups, the first anionic pesticide is free of anionic groups beside carboxylate groups. For example, it is free of thiocarboxylic, sulfonate, sulfininate, thiosulfonate or phosphonate groups.

Suitable pesticides A1 are given in the following. In case the names refer to a neutral form or a salt of the pesticide, the anionic form of the pesticides is meant.

Preferred pesticides A1 are herbicides, such as aromatic acid herbicides, or phenoxycarboxylic acid herbicides. Preferred herbicides are clopyralid, picloram, quinclorac, quinmerac, dicamba, 2,4-dichlorophenoxy)acetic acid (2,4-D), 4-(4-chloro-o-tolyloxy)butyric acid (MCPA), 4-(4-chloro-o-tolyloxy)butyric acid (MCPB), dichlorprop, dichlorprop-P, mecoprop, mecoprop-P, fluoroxypyr, triclopyr.

Suitable aromatic acid herbicides are benzoic acid herbicides, such as chloramben, dicamba, 2,3,6-trichlorobenzoic acid (2,3,6-TBA), tricamba; pyrimidinyloxybenzoic acid herbicides, such as bispyribac, pyriminobac; pyrimidinylthiobenzoic acid herbicides, such as pyrithiobac; phthalic acid herbicides, such as chlorthal; picolinic acid herbicides, such as aminopyralid, clopyralid, picloram; quinolinecarboxylic acid herbicides, such as quinclorac, quinmerac; or other aromatic acid herbicides, such as aminocyclopyrachlor. Preferred are benzoic acid herbicides, especially dicamba.

Suitable phenoxycarboxylic acid herbicides are phenoxyacetic herbicides, such as 4-chlorophenoxyacetic acid (4-CPA), (2,4-dichlorophenoxy)acetic acid (2,4-D), (3,4-dichlorophenoxy)acetic acid (3,4-DA), MCPA (4-(4-chloro-o-tolyloxy)acetic acid), MCPA-thioethyl, (2,4,5-trichlorophenoxy)acetic acid (2,4,5-T); phenoxybutyric herbicides, such as 4-CPB, 4-(2,4-dichlorophenoxy)butyric acid (2,4-DB), 4-(3,4-dichlorophenoxy)butyric acid (3,4-DB), 4-(4-chloro-o-tolyloxy)butyric acid (MCPB), 4-(2,4,5-trichlorophenoxy)butyric acid (2,4,5-TB); phenoxypropionic herbicides, such as cloprop, 2-(4-chlorophenoxy)propanoic acid (4-CPP), dichlorprop, dichlorprop-P, 4-(3,4-dichlorophenoxy)butyric acid (3,4-DP), fenoprop, mecoprop, mecoprop-P; aryloxyphenoxypropionic herbicides, such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P, trifop. Preferred are phenoxyacetic herbicides, especially MCPA.

Suitable other herbicides comprising a carboxylic acid are pyridine herbicides comprising a carboxylic acid, such as fluoroxypyr, triclopyr; triazolopyrimidine herbicides comprising a carboxylic acid, such as cloransulam; pyrimidinylsulfonylurea herbicides comprising a carboxylic acid, such as bensulfuron, chlorimuron, foramsulfuron, halosulfuron, mesosulfuron, primisulfuron, sulfometuron.

Further suitable pesticides A1 are fungicides, such as polyoxin fungicides (e.g. polyoxorim).

Further suitable pesticides A1 are insecticides, such as thuringiensin.

Suitable anionic pesticides are plant growth regulator, such as 1-naphthylacetic acid, (2-naphthyloxy)acetic acid, indol-3-ylacetic acid, 4-indol-3-ylbutyric acid, glyphosine, jasmonic acid, 2,3,5-triiodobenzoic acid, prohexadione, trinexapac, wherein prohexadione and trinexapac are more preferred.

Most preferred pesticides A1 are dicamba, 2,4-D, aminopyralid, aminocyclopyrachlor and MCPA. Especially preferred is dicamba. In another preferred embodiment, 2,4-D is preferred. In another preferred embodiment, MCPA is preferred.

In another preferred embodiment, the second anionic pesticide (A2) is an anionic pesticide wherein at least one anionic group of said anionic pesticide is selected from one or more phosphonate groups (pesticide A2). Preferred pesticides A2 are herbicides, wherein at least one anionic group of said herbicide is selected from one or more phosphonate groups. Examples are organophosphorus herbicides comprising a carboxylic acid group. Suitable organophosphorus herbicides comprising a carboxylic acid group are bilanafos, glufosinate, glufosinate-P, glyphosate. Preferred is pesticide A2 is glyphosate.

Preferably, the first anionic pesticide (A1) contains a carboxylic acid group, and the second anionic pesticide (A2) contains a phosphonate group.

More preferably, the first anionic pesticide is an aromatic acid herbicide or a phenoxycarboxylic acid herbicide, and the second anionic pesticide is an organophosphorus herbicide comprising a carboxylic acid group.

In another preferred embodiment, the first and the second anionic pesticide are selected from dicamba, quinclorac, glyphosate, 2,4-D, aminopyralid and MCPP. For example the first and the second anionic pesticide are dicamba and glyphosate, 2,4-D and dicamba, dicamba and MCPP, 2,4-D and MCPP, or 2,4-D and glyphosate. In a particularly preferred form, the first and the second anionic pesticide are selected from dicamba and glyphosate.

The molar ratio of the sum of the first and the second anionic pesticide (e.g. selected from dicamba and glyphosate) to the sum of the cationic polyamines (B) (e.g. B1.1 or B1.2) is often in the range from 1:10 to 10:1, preferably from 1.3:1 to 10:1, more preferably from 1.5:1 to 4:1, and in particular from 1.7:1 to 3:1. Said molar ratio may depend on the number of electric charges of the ions. For example, one mol of an anionic pesticide comprising one negative charge per mol is usually combined with one mol of cationic polyamine comprising one positive charge per mol. Preferably, the anionic pesticide and the polyamine are combined in such a molar ratio which results to a pH of 6.5 to 9.0, preferably 7.0 to 8.0, when the salt is present in water at 20° C. at a concentration of 480 g/l.

The term "polyamine" within the meaning of the invention relates to an organic compound comprising at least two amino groups, such as an primary, secondary or tertiary amino group.

The term "cationic polyamine" refers to a polyamine, which is present as cation. Preferably, in a cationic polyamine at least one amino group is present in the cationic form of an ammonium, such as R—N$^+$H$_3$, R$_2$—N$^+$H$_2$, or R$_3$—N$^+$H. When formulae, such as (B1), (B2), or (B4), show neutral molecules, they usually refer to their cationic form (i.e. at least one amino group is present in the cationic form of an ammonium, such as R—N$^+$H$_3$, R$_2$—N$^+$H$_2$, or R$_3$—N$^+$H). For example, the cationic form of B1.1 may be represented by at least one of the following formulae:

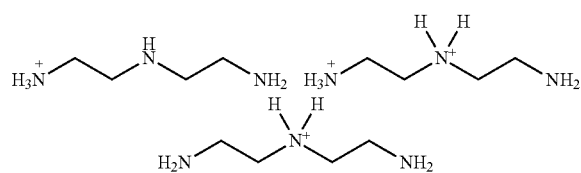

For example, the cationic form of B1.2 may be represented by at least one of the following formulae:

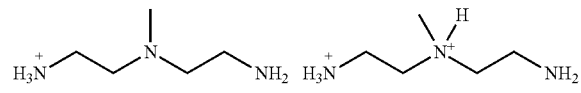

-continued

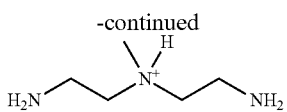

For example, the cationic form of B1.6 may be represented by at least one of the following formulae:

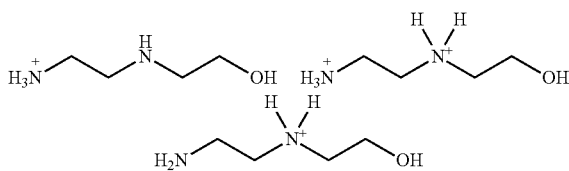

An expert is aware which of the amine groups in the cationic polyamine is preferably protonated, because this depends for example on the pH or the physical form. In aqueous solutions the alkalinity of the amino groups of the cationic polyamine increases usually from tertiary amine to primary amine to secondary amine.

Preferably, the cationic polyamine (B) is a compound of the formula (B1)

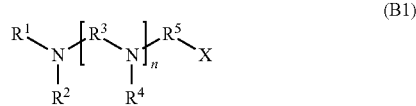

wherein $R^1$, $R^2$, $R^4$, $R^6$ and $R^7$ are independently H or $C_1$-$C_6$-alkyl, which is optionally substituted with OH, $R^3$ and $R^5$ are independently $C_2$-$C_{10}$-alkylene, X is OH or $NR^6R^7$, and n is from 1 to 20; or of the formula (B2)

wherein $R^{10}$ and $R^{11}$ are independently H or $C_1$-$C_6$-alkyl, $R^{12}$ is $C_1$-$C_{12}$-alkylene, and $R^{13}$ is an aliphatic $C_5$-$C_8$ ring system, which comprises either nitrogen in the ring or which is substituted with at least one unit $NR^{10}R^{11}$.

In an embodiment the cationic polyamine has the formula

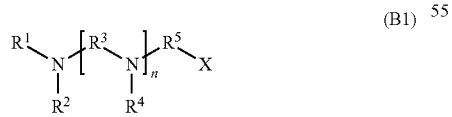

wherein $R^1$, $R^2$, $R^4$, $R^6$, $R^7$ are independently H or $C_1$-$C_6$-alkyl, which is optionally substituted with OH, $R^3$ and $R^5$ are independently $C_2$-$C_{10}$-alkylene, X is OH or $NR^6R^7$, and n is from 1 to 20. $R^1$, $R^2$, $R^4$, $R^6$ and $R^7$ are preferably independently H or methyl. Preferably, $R^1$, $R^2$, $R^6$ and $R^7$ are H. $R^6$ and $R^7$ are preferably identical to $R^1$ and $R^2$, respectively. $R^3$ and $R^5$ are preferably independently $C_2$-$C_4$-alkylene, in particular independently $C_2$-$C_3$-alkylene, such as ethylene (—$CH_2CH_2$—), or n-propylene (—$CH_2CH_2CH_2$—). Typically, $R^3$ and $R^5$ are identical. $R^3$ and $R^5$ may be linear or branched, unsubstituted or substituted with halogen. Preferably, $R^3$ and $R^5$ are linear. Preferably, $R^3$ and $R^5$ are unsubstituted. X is preferably $NR^6R^7$. Preferably, n is from 1 to 10, more preferably from 1 to 6, especially from 1 to 4. In another preferred embodiment, n is from 2 to 10. Preferably, $R^1$, $R^2$, $R^4$, $R^6$ and $R^7$ are independently H or methyl, $R^3$ and $R^5$ are independently $C_2$-$C_3$-alkylene, X is OH or $NR^6R^7$, and n is from 1 to 10.

The group X is bound to $R^5$, which is a $C_2$-$C_{10}$-alkylene group. This means that X may be bound to any carbon atom of the $C_2$-$C_{10}$-alkylene group. Examples of a unit —$R^5$—X are —$CH_2$—$CH_2$—$CH_2$—OH or —$CH_2$—CH(OH)—$CH_3$.

$R^1$, $R^2$, $R^4$, $R^6$, $R^7$ are independently H or $C_1$—$C_6$-alkyl, which is optionally substituted with OH. An example such a substitution is formula (B1.9), in which $R^4$ is H or $C_1$-$C_6$-alkyl substituted with OH (more specifically, $R^4$ is $C_3$-alkyl substituted with OH). Preferably, $R^1$, $R^2$, $R^4$, $R^6$, $R^7$ are independently H or $C_1$-$C_6$-alkyl.

In another preferred embodiment the cationic polymer of the formula (B1) is free of ether groups (—O—). Ether groups are known to enhance photochemical degradation resulting in explosive radicals or peroxy groups.

Examples for cationic polyamines of the formula (B1) wherein X is $NR^6R^7$ are diethylenetriamine (DETA, (B4) with k=1, corresponding to (B1.1)), triethylenetetraamine (TETA, (B4) with k=2), tetraethylenepentaamine (TEPA, (B4) with k=3). Technical qualities of TETA are often mixtures comprising in addition to linear TETA as main component also tris-aminoethylamine TAEA, piperazinoethylethylenediamine PEEDA and Diaminoethylpiperazine DAEP. Technical qualities of TEPA a are often mixtures comprising in addition to linear TEPA as main component also aminoethyltris-aminoethylamine AE-TAEA, aminoethyldiaminoethylpiperazine AE-DAEP and aminoethylpiperazinoethylethylenediamine AE-PEEDA. Such ethyleneamines are commercially available from Dow Chemical Company. Further examples are Pentamethyldiethylenetriamine PMDETA (B1.3), N,N,N',N'',N''-pentamethyl-dipropylenetriamine (B1.4) (commercially available as Jeffcat® ZR-40), N,N-bis(3-dimethylaminopropyl)-N-isopropanolamine (commercially available as Jeffcat® ZR-50), N'-(3-(dimethylamino)propyl)-N,N-dimethyl-1,3-propanediamine (B1.5) (commercially available as Jeffcat® Z-130), and N,N-Bis(3-aminopropyl)methylamine BAPMA (B1.2). Especially preferred are (B4), wherein k is from 1 to 10, (B1.2), (B1.4) and (B1.5). Most preferred are (B4), wherein k is 1, 2, 3, or 4 and (B1.2). In particular preferred are (B1.1) and (B1.2). In a further particular preferred embodiment, the cationic polyamine is (B1.1). In a further particular preferred embodiment, the cationic polyamine is (B1.2).

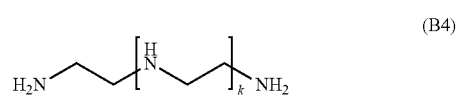

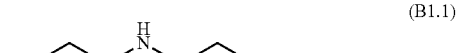

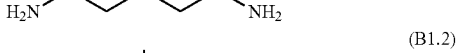

(B1.3)

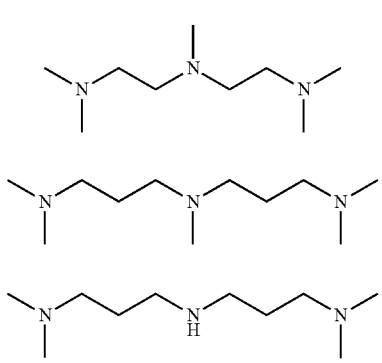

(B1.4)

(B1.5)

Examples for polyamines of the formula (B1) wherein X is OH are N-(3-dimethylaminopropyl)-N,N-diisopropanolamine DPA (B1.9), N,N,N'-trimethylaminoethyl-ethanolamine (B1.7) (commercially available as Jeffcat® Z-110), aminopropylmonomethylethanolamine APMMEA (B1.8), and aminoethylethanolamine AEEA (B1.6). Especially preferred is (B1.6).

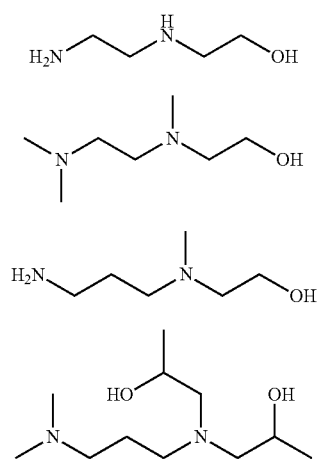

(B1.6)

(B1.7)

(B1.8)

(B1.9)

In another embodiment the cationic polyamine has the formula (B2)

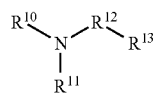

(B2)

wherein $R^{10}$ and $R^{11}$ are independently H or $C_1$-$C_6$-alkyl, $R^{12}$ is $C_2$-$C_{12}$-alkylene, and $R^{13}$ is an aliphatic $C_5$-$C_8$ ring system, which comprises either nitrogen in the ring or which is substituted with at least one unit $NR^{10}R^{11}$.

$R^{10}$ and $R^{11}$ are preferably independently H or methyl, more preferably H. Typically, the unit $C_1$-$C_6$-alkyl of $R^{10}$ and $R^{11}$ is linear or branched, unsubstituted or substituted with halogen. Preferably, the unit $C_1$-$C_6$-alkyl of $R^{10}$ and $R^{11}$ are unsubstituted and linear. More preferably, $R^{10}$ and $R^{11}$ are identical.

$R^{12}$ is preferably $C_2$-$C_4$-alkylene, such as ethylene (—$CH_2CH_2$—), or n-propylene (—$CH_2CH_2CH_2$—). $R^{12}$ may be linear or branched, preferably it is linear. $R^{12}$ may be unsubstituted or substituted with halogen, preferably it is unsubstituted.

$R^{13}$ is an aliphatic $C_5$-$C_8$ ring system, which comprises either nitrogen in the ring or which is substituted with at least one unit $NR^{10}R^{11}$. Preferably, $R^{13}$ is an aliphatic $C_5$-$C_8$ ring system, which comprises nitrogen in the ring. The $C_5$-$C_8$ ring system may be unsubstituted or substituted with at least one $C_1$-$C_6$ alkyl group or at least one halogen. Preferably, the $C_5$-$C_8$ ring system is unsubstituted or substituted with at least one $C_1$-$C_4$ alkyl group. Examples for an aliphatic $C_5$-$C_8$ ring system, which comprises nitrogen in the ring, are piperazyl groups. Examples for $R^{13}$ being an aliphatic $C_5$-$C_8$ ring system, which comprises nitrogen in the ring, are the compounds of the formula (B2.11) and (B2.12) below. Examples for $R^{13}$ being an aliphatic $C_5$-$C_8$ ring system, which is substituted with at least one unit $NR^{10}R^{11}$ is the compound of the formula (B2.10) below.

More preferably, $R^{10}$ and $R^{11}$ are independently H or methyl, $R^{12}$ is $C_2$-$C_3$-alkylene, and $R^{13}$ is an aliphatic $C_5$-$C_8$ ring system, which comprises nitrogen in the ring. In another preferred embodiment the cationic polymer of the formula (B2) is free of ether groups (—O—).

Especially preferred cationic polyamines of formula (B2) are isophorone diamine ISPA (B2.10), aminoethylpiperazine AEP (B2.11), and 1-methyl-4-(2-dimethylaminoethyl)piperazine TAP (B2.12). These compounds are commercially available from Huntsman or Dow, USA. Preferred are (B2.10) and (B2.11), more preferably (B2.11). In another embodiment (B2.11) and (B2.12) are preferred.

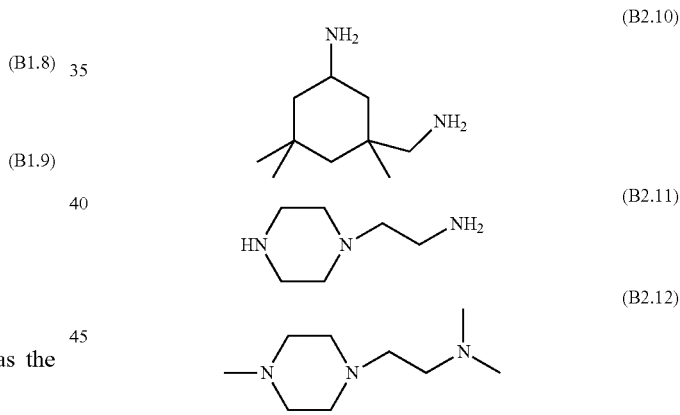

(B2.10)

(B2.11)

(B2.12)

In a further preferred embodiment, the cationic polyamine is a compound of the formula (B1.2), (B1.5) or of the formula (B2).

Cationic Polyamines of the formula (B1), (B2) and (B4) are obtainable by known methods or commercially available.

The present invention also relates to a method for preparing the composition according to the invention comprising the step of contacting the first salt and the second salt. The first salt and the second salt may be combined either neatly or with the salts in its available formulation, for example, dry or solid formulations, as well as liquid formulations such as aqueous formulations.

Preferably, the first salt and the second salt are contacted in water. The water may be removed after the combining for isolation of the salt. The combination may be done at usual temperature such as from −20° C. to 100° C., preferably from 3° C. to 90° C.

The agrochemical composition may comprise at least one further pesticide. The further pesticide can be selected from the group consisting of fungicides, insecticides, nematicides, herbicide and/or safener or growth regulator, preferably from the group consisting of fungicides, insecticides or herbicides, more preferably herbicides. Preferred further pesticides are imidazolinone herbicides and triazine herbicides. The further pesticides are preferably free of an anionic pesticide.

The following list give examples of pesticides which may be used as further pesticide. Preferred further pesticides from this list are those which are not anionic pesticides.

Examples for fungicides are:

A) strobilurins azoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, methyl (2-chloro-5-[1-(3-methylbenzyloxyimino)ethyl]benzyl)carbamate and 2-(2-(3-(2,6-dichlorophenyl)-1-methyl-allylideneaminooxymethyl)-phenyl)-2-methoxyimino-N-methyl-acetamide;

B) carboxamides carboxanilides: benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(3',4',5'-trifluorobiphenyl-2-yl)-3-difluoromethyl-1-methyl-1H-pyrazole-4-carboxamide, N-(4'-trifluoromethylthiobiphenyl-2-yl)-3-difluoromethyl-1-methyl-1H-pyrazole-4-carboxamide and N-(2-(1,3,3-trimethyl-butyl)-phenyl)-1,3-dimethyl-5-fluoro-1H-pyrazole-4-carboxamide;

carboxylic morpholides: dimethomorph, flumorph, pyrimorph;

benzoic acid amides: flumetover, fluopicolide, fluopyram, zoxamide;

other carboxamides: carpropamid, dicyclomet, mandipropamid, oxytetracyclin, silthiofarm and N-(6-methoxy-pyridin-3-yl)cyclopropanecarboxylic acid amide;

C) azoles triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole;

imidazoles: cyazofamid, imazalil, pefurazoate, prochloraz, triflumizol;

benzimidazoles: benomyl, carbendazim, fuberidazole, thiabendazole;

others: ethaboxam, etridiazole, hymexazole and 2-(4-chloro-phenyl)-N-[4-(3,4-dimethoxyphenyl)-isoxazol-5-yl]-2-prop-2-ynyloxy-acetamide;

D) Heterocyclic compounds pyridines: fluazinam, pyrifenox, 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine;

pyrimidines: bupirimate, cyprodinil, diflumetorim, fenarimol, ferimzone, mepanipyrim, nitrapyrin, nuarimol, pyrimethanil;

piperazines: triforine;

pyrroles: fenpiclonil, fludioxonil;

morpholines: aldimorph, dodemorph, dodemorph-acetate, fenpropimorph, tridemorph;

piperidines: fenpropidin;

dicarboximides: fluoroimid, iprodione, procymidone, vinclozolin;

non-aromatic 5-membered heterocycles: famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester;

others: acibenzolar-5-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propyl-chromen-4-one, 5-chloro-1-(4,6-dimethoxypyrimidin-2-yl)-2-methyl-1H-benzoimidazole and 5-chloro-7-(4-methylpiperidin-1-yl)-6-(2,4,6-trifluorophenyl)-[1,2,4]triazolo[1,5-a]pyrimidine;

E) carbamates thio- and dithiocarbamates: ferbam, mancozeb, maneb, metam, methasulphocarb, metiram, propineb, thiram, zineb, ziram;

carbamates: benthiavalicarb, diethofencarb, iprovalicarb, propamocarb, propamocarb hydrochlorid, valifenalate and N-(1-(1-(4-cyano-phenyl)ethanesulfonyl)-but-2-yl) carbamic acid-(4-fluorophenyl) ester;

F) other active substances guanidines: guanidine, dodine, dodine free base, guazatine, guazatine-acetate, iminoctadine, iminoctadine-triacetate, iminoctadine-tris(albesilate);

antibiotics: kasugamycin, kasugamycin hydrochloride-hydrate, streptomycin, polyoxine, validamycin A;

nitrophenyl derivates: binapacryl, dinobuton, dinocap, nitrthal-isopropyl, tecnazen, organometal compounds: fentin salts, such as fentin-acetate, fentin chloride or fentin hydroxide;

sulfur-containing heterocyclyl compounds: dithianon, isoprothiolane;

organophosphorus compounds: edifenphos, fosetyl, fosetyl-aluminum, iprobenfos, phosphorous acid and its salts, pyrazophos, tolclofos-methyl;

organochlorine compounds: chlorothalonil, dichlofluanid, dichlorophen, flusulfamide, hexachlorobenzene, pencycuron, pentachlorphenole and its salts, phthalide, quintozene, thiophanate-methyl, tolylfluanid, N-(4-chloro-2-nitro-phenyl)-N-ethyl-4-methylbenzenesulfonamide;

inorganic active substances: Bordeaux mixture, copper acetate, copper hydroxide, copper oxychloride, basic copper sulfate, sulfur;

others: biphenyl, bronopol, cyflufenamid, cymoxanil, diphenylamin, metrafenone, mildiomycin, oxin-copper, prohexadione-calcium, spiroxamine, tebufloquin, tolylfluanid, N-(cyclopropylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl form amidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl}-thiazole-4-carboxylic acid methyl-(1,2,3,4-tetrahydro-naphthalen-1-yl)-amide, 2-{1-[2-(5-methyl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, methoxy-acetic acid 6-tert-butyl-8-fluoro-2,3-dimethyl-quinolin-4-yl ester and N-Methyl-2-{1-[(5-methyl-3-trifluoromethyl-1H-pyrazol-1-yl)-acetyl]-piperidin-4-yl}-N-[(1R)-1,2,3,4-tetrahydronaphthalen-1-yl]-4-thiazolecarboxamide.

Examples for growth regulators are:

Abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione (prohexadione-calcium), prohydrojasmon, thidiazuron, triapenthenol, tributyl phosphorotrithioate, 2,3,5-tri-iodobenzoic acid, trinexapac-ethyl and uniconazole.

Examples for herbicides are:

acetamides: acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor;

amino acid derivatives: bilanafos, glyphosate (e.g. glyphosate free acid, glyphosate ammonium salt, glyphosate isopropylammonium salt, glyphosate trimethylsulfonium salt, glyphosate potassium salt, glyphosate dimethylamine salt), glufosinate, sulfosate;

aryloxyphenoxypropionates: clodinafop, cyhalofop-butyl, fenoxaprop, fluazifop, haloxyfop, metamifop, propaquizafop, quizalofop, quizalofop-P-tefuryl;

Bipyridyls: diquat, paraquat;

(thio)carbamates: asulam, butylate, carbetamide, desmedipham, dimepiperate, eptam (EPTC), esprocarb, molinate, orbencarb, phenmedipham, prosulfocarb, pyributicarb, thiobencarb, triallate;

cyclohexanediones: butroxydim, clethodim, cycloxydim, profoxydim, sethoxydim, tepraloxydim, tralkoxydim;

dinitroanilines: benfluralin, ethalfluralin, oryzalin, pendimethalin, prodiamine, trifluralin;

diphenyl ethers: acifluorfen, aclonifen, bifenox, diclofop, ethoxyfen, fomesafen, lactofen, oxyfluorfen;

hydroxybenzonitriles: bomoxynil, dichlobenil, ioxynil;

imidazolinones: imazamethabenz, imazamox, imazapic, imazapyr, imazaquin, imazethapyr;

phenoxy acetic acids: clomeprop, 2,4-dichlorophenoxy-acetic acid (2,4-D), 2,4-DB, dichlorprop, MCPA, MCPA-thioethyl, MCPB, Mecoprop;

pyrazines: chloridazon, flufenpyr-ethyl, fluthiacet, norflurazon, pyridate;

pyridines: aminopyralid, clopyralid, diflufenican, dithiopyr, fluridone, fluoroxypyr, picloram, picolinafen, thiazopyr;

sulfonyl ureas: amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propyl-imidazo[1,2-b]pyridazin-3-yl)sulfonyl)-3-(4,6-dimethoxy-pyrimidin-2-yl)urea;

triazines: ametryn, atrazine, cyanazine, dimethametryn, ethiozin, hexazinone, metamitron, metribuzin, prometryn, simazine, terbuthylazine, terbutryn, triaziflam;

ureas: chlorotoluron, daimuron, diuron, fluometuron, isoproturon, linuron, methabenzthiazuron, tebuthiuron;

other acetolactate synthase inhibitors: bispyribac-sodium, cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam;

others: amicarbazone, aminotriazole, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethlyl, chlorthal, cinmethylin, clomazone, cumyluron, cyprosulfamide, dicamba, difenzoquat, diflufenzopyr, *Drechslera monoceras*, endothal, ethofumesate, etobenzanid, fenoxasulfone, fentrazamide, flumiclorac-pentyl, flumioxazin, flupoxam, fluorochloridone, flurtamone, indanofan, isoxaben, isoxaflutole, lenacil, propanil, propyzamide, quinclorac, quinmerac, mesotrione, methyl arsonic acid, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)-phenoxy]-pyridin-2-yloxy)-acetic acid ethyl ester, 6-amino-5-chloro-2-cyclopropyl-pyrimidine-4-carboxylic acid methyl ester, 6-chloro-3-(2-cyclopropyl-6-methylphenoxy)-pyridazin-4-ol, 4-amino-3-chloro-6-(4-chloro-phenyl)-5-fluoro-pyridine-2-carboxylic acid, 4-amino-3-chloro-6-(4-chloro-2-fluoro-3-methoxy-phenyl)-pyridine-2-carboxylic acid methyl ester, and 4-amino-3-chloro-6-(4-chloro-3-dimethylamino-2-fluoro-phenyl)-pyridine-2-carboxylic acid methyl ester.

Examples for insecticides are:

organo(thio)phosphates: acephate, azamethiphos, azinphos-methyl, chlorpyrifos, chlorpyrifos-methyl, chlorfenvinphos, diazinon, dichlorvos, dicrotophos, dimethoate, disulfoton, ethion, fenitrothion, fenthion, isoxathion, malathion, methamidophos, methidathion, methylparathion, mevinphos, monocrotophos, oxydemeton-methyl, paraoxon, parathion, phenthoate, phosalone, phosmet, phosphamidon, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alphacypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin;

insect growth regulators: a) chitin synthesis inhibitors: benzoylureas: chlorfluazuron, cyramazin, diflubenzuron, flucycloxuron, flufenoxuron, hexaflumuron, lufenuron, novaluron, teflubenzuron, triflumuron; buprofezin, diofenolan, hexythiazox, etoxazole, clofentazine; b) ecdysone antagonists: halofenozide, methoxyfenozide, tebufenozide, azadirachtin; c) juvenoids: pyriproxyfen, methoprene, fenoxycarb; d) lipid biosynthesis inhibitors: spirodiclofen, spiromesifen, spirotetramat;

nicotinic receptor agonists/antagonists compounds: clothianidin, dinotefuran, imidacloprid, thiamethoxam, nitenpyram, acetamiprid, thiacloprid, 1-(2-chloro-thiazol-5-ylmethyl)-2-nitrimino-3,5-dimethyl-[1,3,5]triazinane;

GABA antagonist compounds: endosulfan, ethiprole, fipronil, vaniliprole, pyrafluprole, pyriprole, 5-amino-1-(2,6-dichloro-4-methyl-phenyl)-4-sulfinamoyl-1H-pyrazole-3-carbothioic acid amide;

macrocyclic lactone insecticides: abamectin, emamectin, milbemectin, lepimectin, spinosad, spinetoram;

mitochondrial electron transport inhibitor (METI) I acaricides: fenazaquin, pyridaben, tebufenpyrad, tolfenpyrad, flufenerim;

METI II and III compounds: acequinocyl, fluacyprim, hydramethylnon;

Uncouplers: chlorfenapyr;

oxidative phosphorylation inhibitors: cyhexatin, diafenthiuron, fenbutatin oxide, propargite;

moulting disruptor compounds: cryomazine;

mixed function oxidase inhibitors: piperonyl butoxide;

sodium channel blockers: indoxacarb, metaflumizone;

others: benclothiaz, bifenazate, cartap, flonicamid, pyridalyl, pymetrozine, sulfur, thiocyclam, flubendiamide, chlorantraniliprole, cyazypyr (HGW86), cyenopyrafen, flupyrazofos, cyflumetofen, amidoflumet, imicyafos, bistrifluoron, and pyrifluquinazon.

The compositions according to the invention are suitable as herbicides. They are suitable as such or as an appropriately formulated composition. The compositions according to the invention control vegetation on non-crop areas very efficiently, especially at high rates of application. They act against broad-leafed weeds and grass weeds in crops such as wheat, rice, corn, soybeans and cotton without causing any significant damage to the crop plants. This effect is mainly observed at low rates of application.

Depending on the application method in question, the compositions according to the invention can additionally be employed in a further number of crop plants for eliminating undesirable plants. Examples of suitable crops are the following:

*Allium cepa, Ananas comosus, Arachis hypogaea, Asparagus officinalis, Avena sativa, Beta vulgaris* spec. *altissima, Beta vulgaris* spec. *rapa, Brassica napus* var. *napus, Brassica napus* var. *napobrassica, Brassica rapa* var. *silvestris, Brassica oleracea, Brassica nigra, Brassica juncea, Brassica campestris, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum,* (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea, Oryza sativa, Phaseolus lunatus, Phaseolus vulgaris, Picea abies, Pinus* spec., *Pistacia vera, Pisum sativum, Prunus avium, Prunus persica, Pyrus communis, Prunus armeniaca, Prunus cerasus, Prunus dulcis* and *prunus domestica, Ribes sylvestre, Ricinus communis, Saccharum officinarum, Secale cereale, Sinapis alba, Solanum tuberosum, Sorghum bicolor* (*s. vulgare*), *Theobroma cacao, Trifolium pratense, Triticum aestivum, Triticale, Triticum durum, Vicia faba, Vitis vinifera, Zea mays.*

Preferred crops are: *Arachis hypogaea, Beta vulgaris* spec. *altissima, Brassica napus* var. *napus, Brassica oleracea, Brassica juncea, Citrus limon, Citrus sinensis, Coffea arabica* (*Coffea canephora, Coffea liberica*), *Cynodon dactylon, Glycine max, Gossypium hirsutum,* (*Gossypium arboreum, Gossypium herbaceum, Gossypium vitifolium*), *Helianthus annuus, Hordeum vulgare, Juglans regia, Lens culinaris, Linum usitatissimum, Lycopersicon lycopersicum, Malus* spec., *Medicago sativa, Nicotiana tabacum* (*N. rustica*), *Olea europaea, Oryza sativa, Phaseolus lunatus, Phaseolus vulgaris, Pistacia vera, Pisum sativum, Prunus dulcis, Saccharum officinarum, Secale cereale, Solanum tuberosum, Sorghum bicolor* (*s. vulgare*), *Triticale, Triticum aestivum, Triticum durum, Vicia faba, Vitis vinifera* and *Zea mays*

The compositions according to the invention can also be used in genetically modified plants, e.g. to alter their traits or characteristics. The term "genetically modified plants" is to be understood as plants, which genetic material has been modified by the use of recombinant DNA techniques in a way that under natural circumstances it cannot readily be obtained by cross breeding, mutations, natural recombination, breeding, mutagenesis, or genetic engineering. Typically, one or more genes have been integrated into the genetic material of a genetically modified plant in order to improve certain properties of the plant. Such genetic modifications also include but are not limited to targeted posttranstional modification of protein(s), oligo- or polypeptides e.g. by glycosylation or polymer additions such as prenylated, acetylated or farnesylated moieties or PEG moieties.

Plants that have been modified by breeding, mutagenesis or genetic engineering, e.g. have been rendered tolerant to applications of specific classes of herbicides, are particularly useful with the compositions according to the invention. Tolerance to classes of herbicides has been developed such as auxin herbicides such as dicamba or 2,4-D; bleacher herbicides such as hydroxyphenylpyruvate dioxygenase (HPPD) inhibitors or phytoene desaturase (PDS) inhibitors; acetolactate synthase (ALS) inhibitors such as sulfonyl ureas or imidazolinones; enolpyruvyl shikimate 3-phosphate synthase (EPSP) inhibitors such as glyphosate; glutamine synthetase (GS) inhibitors such as glufosinate; protoporphyrinogen-IX oxidase (PPO) inhibitors; lipid biosynthesis inhibitors such as acetyl CoA carboxylase (ACCase) inhibitors; or oxynil (i.e. bromoxynil or ioxynil) herbicides as a result of conventional methods of breeding or genetic engineering. Furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are, for example, described in Pest Management Science 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein. Examples of these herbicide resistance technologies are also described in US 2008/0028482, US2009/0029891, WO 2007/143690, WO 2010/080829, U.S. Pat. No. 6,307,129, U.S. Pat. No. 7,022,896, US 2008/0015110, U.S. Pat. No. 7,632,985, U.S. Pat. No. 7,105,724, and U.S. Pat. No. 7,381,861, each herein incorporated by reference.

Several cultivated plants have been rendered tolerant to herbicides by conventional methods of breeding (mutagenesis), e.g. Clearfield® summer rape (Canola, BASF SE, Germany) being tolerant to imidazolinones, e.g. imazamox, or ExpressSun® sunflowers (DuPont, USA) being tolerant to sulfonyl ureas, e.g. tribenuron. Genetic engineering methods have been used to render cultivated plants such as soybean, cotton, corn, beets and rape, tolerant to herbicides such as glyphosate, dicamba, imidazolinones and glufosinate, some of which are under development or commercially available under the brands or trade names RoundupReady® (glyphosate tolerant, Monsanto, USA), Cultivance® (imidazolinone tolerant, BASF SE, Germany) and LibertyLink® (glufosinate tolerant, Bayer CropScience, Germany).

Furthermore, plants are also covered that are by the use of recombinant DNA techniques capable to synthesize one or more insecticidal proteins, especially those known from the bacterial genus *Bacillus*, particularly from *Bacillus thuringiensis*, such as ä-endotoxins, e.g. CryIA(b), CryIA(c), CryIF, CryIF(a2), CryIIA(b), CryIIIA, CryIIIB(b1) or Cry9c; vegetative insecticidal proteins (VIP), e.g. VIP1, VIP2, VIP3 or VIP3A; insecticidal proteins of bacteria colonizing nematodes, e.g. *Photorhabdus* spp. or *Xenorhabdus* spp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxy-steroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be under-stood expressly also as pre-toxins, hybrid proteins, truncated or otherwise modified proteins. Hybrid proteins are characterized by a new combination of protein domains, (see, e.g. WO 02/015701). Further examples of such toxins or genetically modified plants capable of synthesizing such toxins are dis-closed, e.g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e.g. in the publications mentioned above. These insecticidal proteins contained in the genetically modified plants impart to the plants producing these proteins tolerance to harmful pests from all taxonomic groups of athropods, especially to beetles (Coeloptera), two-winged insects (Diptera), and moths (Lepidoptera) and to nematodes (Nematoda). Genetically modified plants capable to synthesize one or more insecticidal pro-teins are, e.g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e.g. Agrisure® CB) and Bt176 from Syngenta Seeds SAS, France, (corn cultivars producing the Cry1Ab toxin and PAT enyzme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g. EP-A 392 225), plant disease resistance genes (e.g. potato culti-vars, which express resistance genes acting against *Phytophthora infestans* derived from the mexican wild potato *Solanum bulbocastanum*) or T4-lyso-zym (e.g. potato cultivars capable of synthesizing these proteins with increased resistance against bacteria such as Erwinia amylvora). The methods for producing such genetically modi-fied plants are generally known to the person skilled in the art and are described, e.g. in the publications mentioned above.

Furthermore, plants are also covered that are by the use of recombinant DNA techniques capable to synthesize one or more proteins to increase the productivity (e.g. bio mass production, grain yield, starch content, oil content or protein content), tolerance to drought, salinity or other growth-limiting environ-mental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e.g. oil crops that produce health-promoting long-chain omega-3 fatty acids or unsaturated omega-9 fatty acids (e.g. Nexera® rape, DOW Agro Sciences, Canada).

Furthermore, plants are also covered that contain by the use of recombinant DNA techniques a modified amount of substances of content or new substances of content, specifically to improve raw material production, e.g. potatoes that produce increased amounts of amylopectin (e.g. Amflora® potato, BASF SE, Germany).

Furthermore, it has been found that the compositions according to the invention are also suitable for the defoliation and/or desiccation of plant parts, for which crop plants such as cotton, potato, oilseed rape, sunflower, soybean or field beans, in particular cotton, are suitable. In this regard compositions have been found for the desiccation and/or defoliation of plants, processes for preparing these compositions, and methods for desiccating and/or defoliating plants using the compositions according to the invention.

As desiccants, the compositions according to the invention are suitable in particular for desiccating the above-ground parts of crop plants such as potato, oilseed rape, sunflower and soybean, but also cereals. This makes possible the fully mechanical harvesting of these important crop plants.

Also of economic interest is the facilitation of harvesting, which is made possible by concentrating within a certain period of time the dehiscence, or reduction of adhesion to the tree, in citrus fruit, olives and other species and varieties of pomaceous fruit, stone fruit and nuts. The same mechanism, i.e. the promotion of the development of abscission tissue between fruit part or leaf part and shoot part of the plants is also essential for the controlled defoliation of useful plants, in particular cotton. Moreover, a shortening of the time interval in which the individual cotton plants mature leads to an increased fiber quality after harvesting.

The compositions according to the invention are applied to the plants mainly by spraying the leaves. Here, the application can be carried out using, for example, water as carrier by customary spraying techniques using spray liquor amounts of from about 100 to 1000 l/ha (for example from 300 to 400 l/ha). The herbicidal compositions may also be applied by the low-volume or the ultra-low-volume method, or in the form of microgranules.

The herbicidal compositions according to the present invention can be applied pre- or postemergence, or together with the seed of a crop plant. It is also possible to apply the compounds and compositions by applying seed, pretreated with a composition of the invention, of a crop plant. If the active compounds A and C and, if appropriate C, are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (postdirected, lay-by).

In a further embodiment, the composition according to the invention can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on the compositions according to the invention. Here, the herbicidal compositions can be applied diluted or undiluted.

The term seed comprises seed of all types, such as, for example, corns, seeds, fruits, tubers, seedlings and similar forms. Here, preferably, the term seed describes corns and seeds.

The seed used can be seed of the useful plants mentioned above, but also the seed of trans-genic plants or plants obtained by customary breeding methods.

The rates of application of the active compound are from 0.0001 to 3.0, preferably 0.01 to 1.0 kg/ha of active substance (a.s.), depending on the control target, the season, the target plants and the growth stage. To treat the seed, the pesticides are generally employed in amounts of from 0.001 to 10 kg per 100 kg of seed.

Moreover, it may be advantageous to apply the compositions of the present invention on their own or jointly in combination with other crop protection agents, for example with agents for controlling pests or phytopathogenic fungi or bacteria or with groups of active compounds which regulate growth. Also of interest is the miscibility with mineral salt solutions which are employed for treating nutritional and trace element deficiencies. Non-phytotoxic oils and oil concentrates can also be added.

The composition according to the invention can be converted into customary types of agrochemical compositions, e.g. solutions, emulsions, suspensions, dusts, powders, pastes and granules. The composition type depends on the particular intended purpose; in each case, it should ensure a fine and uniform distribution of the compound according to the invention. Examples for composition types are suspensions (SC, OD, FS), emulsifiable concentrates (EC), emulsions (EW, EO, ES), pastes, pastilles, wettable powders or dusts (WP, SP, SS, WS, DP, DS) or granules (GR, FG, GG, MG), which can be water-soluble or wettable, as well as gel formulations for the treatment of plant propagation materials such as seeds (GF). Usually the composition types (e.g. SC, OD, FS, EC, WG, SG, WP, SP, SS, WS, GF) are employed diluted. Composition types such as DP, DS, GR, FG, GG and MG are usually used undiluted. The compositions are prepared in a known manner. When the agrochemical composition is an aqueous composition, the salt according to the invention may dissociate into anions and cations.

The agrochemical compositions may also comprise auxiliaries which are customary in agrochemical compositions. The auxiliaries used depend on the particular application form and active substance, respectively. Examples for suitable auxiliaries are solvents, solid carriers, dispersants or emulsifiers (such as further solubilizers, protective colloids, surfactants and adhesion agents), organic and anorganic thickeners, bactericides, anti-freezing agents, anti-foaming agents, if appropriate colorants and tackifiers or binders (e.g. for seed treatment formulations).

Suitable solvents are water, organic solvents such as mineral oil fractions of medium to high boiling point, such as kerosene or diesel oil, furthermore coal tar oils and oils of vegetable or animal origin, aliphatic, cyclic and aromatic hydrocarbons, e.g. toluene, xylene, paraffin, tetrahydronaphthalene, alkylated naphthalenes or their derivatives, alcohols such as methanol, ethanol, propanol, butanol and cyclohexanol, glycols (such as ethylene glycol or 1,2-propylene glycol), ketones such as cyclohexanone and gamma-butyrolactone, fatty acid dimethylamides, fatty acids and fatty acid esters and strongly polar solvents, e.g. amines such as N-methylpyrrolidone. Preferred solvent is water.

Solid carriers are mineral earths such as silicates, silica gels, talc, kaolins, limestone, lime, chalk, bole, loess, clays, dolomite, diatomaceous earth, calcium sulfate, magnesium sulfate, iron sulfate, magnesium oxide, ground synthetic materials, fertilizers, such as, e.g., ammonium sulfate, ammonium phosphate, ammonium nitrate, ureas, and products of vegetable origin, such as cereal meal, tree bark meal, wood meal and nutshell meal, cellulose powders and other solid carriers.

Suitable surfactants (adjuvants, wetters, tackifiers, dispersants or emulsifiers) are alkali metal, alkaline earth metal and ammonium salts of aromatic sulfonic acids, such as ligninsoulfonic acid (Borrespesre® types, Borregard, Norway) phenolsulfonic acid, naphthalenesulfonic acid (Morwet® types, Akzo Nobel, U.S.A.), dibutylnaphthalenesulfonic acid (Nekal® types, BASF, Germany), and fatty acids, alkylsulfonates, alkylarylsulfonates, alkyl sulfates, laurylether sulfates, fatty alcohol sulfates, and sulfated hexa-, hepta- and octadecanolates, sulfated fatty alcohol glycol ethers, furthermore condensates of naphthalene or of naphthalenesulfonic acid with phenol and formaldehyde, polyoxy-ethylene octylphenyl ether, ethoxylated isooctylphenol, octylphenol, nonylphenol, alkylphenyl polyglycol ethers, tributylphenyl polyglycol ether, tristearylphenyl polyglycol ether, alkylaryl polyether alcohols, alcohol and fatty alcohol/ethylene oxide condensates, ethoxylated castor oil, polyoxyethylene alkyl ethers, ethoxylated polyoxypropylene, lauryl alcohol polyglycol ether acetal, sorbitol esters, lignin-sulfite waste liquors and proteins, denatured proteins, polysaccharides (e.g. methylcellulose), hydrophobically modified starches, polyvinyl alcohols (Mowiol® types, Clariant, Switzerland), polycarboxylates (Sokolan® types, BASF, Germany), polyalkoxylates, polyvinylamines (Lupasol® types, BASF, Germany), polyvinylpyrrolidone and the copolymers thereof. Further suitable surfactants (especially for agrochemical compositions comprising glyphosate) are alkoxylated $C_{4-22}$-alkylamines, such as ethoxylated tallow amine (POEA) and the surfactans disclosed in EP1389040 (e.g. those in Examples 1 to 14).

Examples for thickeners (i.e. compounds that impart a modified flowability to compositions, i.e. high viscosity under static conditions and low viscosity during agitation) are polysaccharides and organic and anorganic clays such as Xanthan gum (Kelzan®, CP Kelco, U.S.A.), Rhodopol® 23 (Rhodia, France), Veegum® (R.T. Vanderbilt, U.S.A.) or Attaclay® (Engelhard Corp., NJ, USA). Bactericides may be added for preservation and stabilization of the composition. Examples for suitable bactericides are those based on dichlorophene and benzylalcohol hemi formal (Proxel® from ICI or Acticide® RS from Thor Chemie and Kathon® MK from Rohm & Haas) and isothiazolinone derivatives such as alkylisothiazolinones and benzisothiazolinones (Acticide® MBS from Thor Chemie). Examples for suitable anti-freezing agents are ethylene glycol, propylene glycol, urea and glycerin. Examples for anti-foaming agents are silicone emulsions (such as e.g. Silikon® SRE, Wacker, Germany or Rhodorsil®, Rhodia, France), long chain alcohols, fatty acids, salts of fatty acids, fluoroorganic compounds and mixtures thereof. Examples for tackifiers or binders are polyvinylpyrrolidons, polyvinylacetates, polyvinyl alcohols and cellulose ethers (Tylose®, Shin-Etsu, Japan). Examples of colorants are both sparingly water-soluble pigments and water-soluble dyes. Examples which may be mentioned are the dyes known under the names Rhodamin B, C.I. Pigment Red 112 and C.I. Solvent Red 1, and also pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108.

Powders, materials for spreading and dusts can be prepared by mixing or concomitantly grinding the salts according to the invention and, if appropriate, further active substances, with at least one solid carrier. Granules, e.g. coated granules, impregnated granules and homogeneous granules, can be prepared by binding the active substances to solid carriers. Examples of solid carriers are mineral earths such as silica gels, silicates, talc, kaolin, attaclay, limestone, lime, chalk, bole, loess, clay, dolomite, diatomaceous earth, calcium sulfate, magnesium sulfate, magnesium oxide, ground synthetic materials, fertilizers, such as, e.g., ammonium sulfate, ammonium phosphate, ammonium nitrate, ureas, and products of vegetable origin, such as cereal meal, tree bark meal, wood meal and nutshell meal, cellulose powders and other solid carriers.

Examples for composition types are:
1. Composition types for dilution with water
i) Water-soluble concentrates (SL, LS)

50 parts by weight of the salts (sum of first and second salt) are dissolved in 50 parts by weight of water or in a water-soluble solvent. As an alternative, wetting agents or other auxiliaries are added. The active substance dissolves upon dilution with water. In this way, a composition having a content of 10% by weight of active substance is obtained.
ii) Dispersible concentrates (DC)

20 parts by weight of the salts (sum of first and second salt) are dissolved in 70 parts by weight of cyclohexanone with addition of 10 parts by weight of a dispersant, e.g. polyvinylpyrrolidone. Dilution with water gives a dispersion. The active substance content is 20% by weight.
iii) Emulsifiable concentrates (EC)

15 parts by weight of the salts (sum of first and second salt) are dissolved in 75 parts by weight of xylene with addition of calcium dodecylbenzenesulfonate and castor oil ethoxylate (in each case 5 parts by weight). Dilution with water gives an emulsion. The composition has an active substance content of 15% by weight.
iv) Emulsions (EW, EO, ES)

25 parts by weight of the salts (sum of first and second salt) are dissolved in 35 parts by weight of xylene with addition of calcium dodecylbenzenesulfonate and castor oil ethoxylate (in each case 5 parts by weight). This mixture is introduced into 30 parts by weight of water by means of an emulsifying machine (Ultraturrax) and made into a homogeneous emulsion. Dilution with water gives an emulsion. The composition has an active substance content of 25% by weight.
v) Suspensions (SC, OD, FS)

In an agitated ball mill, 20 parts by weight of the salts (sum of first and second salt) are comminuted with addition of 10 parts by weight of dispersants and wetting agents and 70 parts by weight of water or an organic solvent to give a fine active substance suspension. Dilution with water gives a stable suspension of the active substance. The active substance content in the composition is 20% by weight.
vi) Water-dispersible granules and water-soluble granules (WG, SG)

50 parts by weight of the salts (sum of first and second salt) are ground finely with addition of 50 parts by weight of dispersants and wetting agents and prepared as water-dispersible or water-soluble granules by means of technical appliances (e.g. extrusion, spray tower, fluidized bed). Dilution with water gives a stable dispersion or solution of the active substance. The composition has an active substance content of 50% by weight.
vii) Water-dispersible powders and water-soluble powders (WP, SP, SS, WS)

75 parts by weight of the salts (sum of first and second salt) are ground in a rotor-stator mill with addition of 25 parts by weight of dispersants, wetting agents and silica gel. Dilution with water gives a stable dispersion or solution of the active substance. The active substance content of the composition is 75% by weight.
viii) Gel (GF)

In an agitated ball mill, 20 parts by weight of the salts (sum of first and second salt) are comminuted with addition of 10 parts by weight of dispersants, 1 part by weight of a gelling agent wetters and 70 parts by weight of water or of an organic solvent to give a fine suspension of the active substance. Dilution with water gives a stable suspension of the active substance, whereby a composition with 20% (w/w) of active substance is obtained.

2. Composition types to be applied undiluted ix) Dustable powders (DP, DS)

5 parts by weight of the salts (sum of first and second salt) are ground finely and mixed intimately with 95 parts by weight of finely divided kaolin. This gives a dustable composition having an active substance content of 5% by weight.

x) Granules (GR, FG, GG, MG)

0.5 parts by weight of the salts (sum of first and second salt) is ground finely and associated with 99.5 parts by weight of carriers. Current methods are extrusion, spray-drying or the fluidized bed. This gives granules to be applied undiluted having an active substance content of 0.5% by weight.

xi) ULV solutions (UL)

10 parts by weight of the salts (sum of first and second salt) are dissolved in 90 parts by weight of an organic solvent, e.g. xylene. This gives a composition to be applied undiluted having an active substance content of 10% by weight.

The composition types i), iv), vii) and x) are preferred. The composition type i) is especially preferred.

The agrochemical compositions generally comprise between 0.01 and 95%, preferably between 0.1 and 90%, most preferably between 0.5 and 90%, by weight of salts the salts (sum of first and second salt). These active substances are employed in a purity of from 90% to 100%, preferably from 95% to 100% (according to NMR spectrum). Water-soluble concentrates (LS), flow-able concentrates (FS), powders for dry treatment (DS), water-dispersible powders for slurry treatment (WS), water-soluble powders (SS), emulsions (ES) emulsifiable concentrates (EC) and gels (GF) are usually employed for the purposes of treatment of plant propagation materials, particularly seeds. These compositions can be applied to plant propagation materials, particularly seeds, diluted or undiluted. The compositions in question give, after two-to-tenfold dilution, active substance concentrations of from 0.01 to 60% by weight, preferably from 0.1 to 40% by weight, in the ready-to-use preparations.

Very suitable agrochemical compositions of the salts according to the invention are:

a) Water-soluble concentrate
   10-70 wt % salts (sum of first and second salt) and optionally at least one further pesticide, 30-90 wt % water, and optionally up to 10 wt % auxiliaries, such as surfactants, thickeners, or colorants, wherein the amount of all components adds up to 100 wt %.
b) Wettable-powder
   10-90 wt % salts (sum of first and second salt) and optionally at least one further pesticide, 9-80 wt % solid carrier, 1-10 wt % surfactant, and optionally auxiliaries, wherein the amount of all components adds up to 100 wt %.
c) Water dispersable granules
   10-90 wt % salts (sum of first and second salt) and optionally at least one further pesticide, 9-80 wt % solid carrier, 1-10 wt % surfactant, and optionally auxiliaries, wherein the amount of all components adds up to 100 wt %.
d) Granules
   0.5-20 wt % salts (sum of first and second salt) and optionally at least one further pesticide, 0.5-20 wt % solvent, 40-99 wt % solid carrier, and optionally auxiliaries, wherein the amount of all components adds up to 100 wt %.

In another form, very suitable agrochemical compositions of the salts according to the invention is a water-soluble concentrate comprising 10-70 wt % salts (sum of first and second salt) comprising dicamba, glyphosate and (B1.1), and optionally at least one further pesticide, 30-90 wt % water, and optionally up to 10 wt % auxiliaries, such as surfactants, thickeners, or colorants, wherein the amount of all components adds up to 100 wt %.

In another form, very suitable agrochemical compositions of the salts according to the invention is a water-soluble concentrate comprising 10-70 wt % salts (sum of first and second salt) comprising dicamba, glyphosate and (B1.2), and optionally at least one further pesticide, 30-90 wt % water, and optionally up to 10 wt % auxiliaries, such as surfactants, thickeners, or colorants, wherein the amount of all components adds up to 100 wt %.

Especially suitable agrochemical compositions of the salts according to the invention are:

a) Water-soluble concentrate
   20-60 wt % salts (sum of first and second salt) comprising dicamba (as A1), glyphosate (as A2) and (B1), dicamba, glyphosate and (B2), or dicamba, glyphosate and (B4) [preferably dicamba, glyphosate and (B1.1), dicamba, glyphosate and (B1.2), dicamba, glyphosate and (B1.3), dicamba, glyphosate and (B1.4), dicamba, glyphosate and (B1.5), dicamba, glyphosate and (B1.6), dicamba, glyphosate and (B1.7), dicamba, glyphosate and (B1.8), dicamba, glyphosate and (B1.9), dicamba, glyphosate and (B2.10), dicamba, glyphosate and (B2.11), or dicamba, glyphosate and (B2.12)] and optionally at least one further pesticide, 40-80 wt % water, and optionally up to 10 wt % auxiliaries, such as surfactants, thickeners or colorants, wherein the amount of all components adds up to 100 wt %.
b) Wettable-powder
   10-90 wt % salts (sum of first and second salt) comprising dicamba (as A1), glyphosate (as A2) and (B1), dicamba, glyphosate and (B2), or dicamba, glyphosate and (B4) [preferably dicamba, glyphosate and (B1.1), dicamba, glyphosate and (B1.2), dicamba, glyphosate and (B1.3), dicamba, glyphosate and (B1.4), dicamba, glyphosate and (B1.5), dicamba, glyphosate and (B1.6), dicamba, glyphosate and (B1.7), dicamba, glyphosate and (B1.8), dicamba, glyphosate and (B1.9), dicamba, glyphosate and (B2.10), dicamba, glyphosate and (B2.11), or dicamba, glyphosate and (B2.12)] and optionally at least one further pesticide, 9-80 wt % solid carrier, 1-10 wt % surfactant, and optionally auxiliaries, wherein the amount of all components adds up to 100 wt %.
c) Water dispersable granules
   10-90 wt % salts (sum of first and second salt) comprising dicamba (as A1), glyphosate (as A2) and (B1), dicamba, glyphosate and (B2), or dicamba, glyphosate and (B4) [preferably dicamba, glyphosate and (B1.1), dicamba, glyphosate and (B1.2), dicamba, glyphosate and (B1.3), dicamba, glyphosate and (B1.4), dicamba, glyphosate and (B1.5), dicamba, glyphosate and (B1.6), dicamba, glyphosate and (B1.7), dicamba, glyphosate and (B1.8), dicamba, glyphosate and (B1.9), dicamba, glyphosate and (B2.10), dicamba, glyphosate and (B2.11), or dicamba, glyphosate and (B2.12)] and optionally at least one further pesticide, 9-80 wt % solid carrier, 1-10 wt % surfactant, and optionally auxiliaries, wherein the amount of all components adds up to 100 wt %.
d) Granules
   0.5-20 wt % salts (sum of first and second salt) comprising dicamba (as A1), glyphosate (as A2) and (B1), dicamba, glyphosate and (B2), or dicamba, glyphosate and (B4) [preferably dicamba, glyphosate and (B1.1), dicamba, glyphosate and (B1.2), dicamba, glyphosate and (B1.3), dicamba, glyphosate and (B1.4), dicamba, glyphosate and (B1.5), dicamba, glyphosate and (B1.6), dicamba, glyphosate and (B1.7), dicamba, glyphosate and (B1.8), dicamba, glyphosate and (B1.9), dicamba, glyphosate and (B2.10), dicamba, glyphosate and (B2.11), or dicamba, glyphosate and (B2.12)] and optionally at least one further pesticide, 0.5-20 wt % solvent (e.g. glycols), 40-99 wt % solid carrier, and optionally auxiliaries, wherein the amount of all components adds up to 100 wt %.

In another embodiment the especially suitable agrochemical compositions of the salts according to the invention is a water-soluble concentrate comprising 20-60 wt % salts (sum of first and second salt) comprising dicamba, glyphosate and (B1.1), and optionally at least one further pesticide, 80-40 wt % water, and optionally up to 10 wt % auxiliaries, such as surfactants (e.g. ethoxylated tallow amine), thickeners or colorants, wherein the amount of all components adds up to 100 wt %.

In another embodiment the especially suitable agrochemical compositions of the salts according to the invention is a water-soluble concentrate comprising 20-60 wt % salts (sum of first and second salt) comprising dicamba, glyphosate and (B1.2), and optionally at least one further pesticide, 80-40 wt % water, and optionally up to 10 wt % auxiliaries, such as surfactants (e.g. ethoxylated tallow amine), thickeners or colorants, wherein the amount of all components adds up to 100 wt %.

In another embodiment the especially suitable agrochemical compositions of the salts according to the invention are:
a) Water-soluble concentrate
   20-60 wt % salts (sum of first and second salt) comprising dicamba (as A1), glyphosate (as A2) and (B1.2), dicamba, glyphosate and (B1.5), or dicamba, glyphosate and (B2) [preferably dicamba, glyphosate and (B1.2), dicamba, glyphosate and (B1.5), dicamba, glyphosate and (B2.10), dicamba, glyphosate and (B2.11), or dicamba, glyphosate and (B2.12)] and optionally at least one further pesticide, 80-40 wt % water, and optionally up to 10 wt % auxiliaries, such as surfactants (e.g. ethoxylated tallow amine), thickeners or colorants, wherein the amount of all components adds up to 100 wt %.
b) Wettable-powder
   10-90 wt % salts (sum of first and second salt) comprising dicamba, glyphosate and (B1.2), dicamba, glyphosate and (B1.5), or dicamba, glyphosate and (B2) [preferably dicamba, glyphosate and (B1.2), dicamba, glyphosate and (B1.5), dicamba, glyphosate and (B2.10), dicamba, glyphosate and (B2.11), or dicamba, glyphosate and (B2.12)] and optionally at least one further pesticide, 9-80 wt % solid carrier, 1-10 wt % surfactant (e.g. ethoxylated tallow amine), and optionally auxiliaries, wherein the amount of all components adds up to 100 wt %.
c) Water dispersable granules
   10-90 wt % salts (sum of first and second salt) comprising dicamba, glyphosate and (B1.2), dicamba, glyphosate and (B1.5), or dicamba, glyphosate and (B2) [preferably dicamba, glyphosate and (B1.2), dicamba, glyphosate and (B1.5), dicamba, glyphosate and (B2.10), dicamba, glyphosate and (B2.11), or dicamba, glyphosate and (B2.12)] and optionally at least one further pesticide, 9-80 wt % solid carrier, 1-10 wt % surfactant (e.g. ethoxylated tallow amine), and optionally auxiliaries, wherein the amount of all components adds up to 100 wt %.
d) Granules
   0.5-20 wt % salts (sum of first and second salt) comprising dicamba, glyphosate and (B1.2), dicamba, glyphosate and (B1.5), or dicamba, glyphosate and (B2) [preferably dicamba, glyphosate and (B1.2), dicamba, glyphosate and (B1.5), dicamba, glyphosate and (B2.10), dicamba, glyphosate and (B2.11), or dicamba, glyphosate and (B2.12)] and optionally at least one further pesticide, 0.5-20 wt % solvent (e.g. glycols), 40-99 wt % solid carrier, and optionally auxiliaries (e.g. ethoxylated tallow amine), wherein the amount of all components adds up to 100 wt %.

In a further especially preferred embodiment, the agrochemical composition is a water-dispersible granule, which comprises a first salt of dicamba, a second salt of glyphosate, a cationic polyamine (B) selected from (B1.1), (B1.2), (B1.3), (B1.4), (B1.5), (B1.6), (B1.7), (B1.8), (B1.8), (B1.9), (B2.10), (B2.11), or (B2.12), pyraclostrobin as further pesticide and optionally an adjuvant. This agrochemical composition may, in another embodiment, be present in form of a suspension concentrate.

In a further especially preferred embodiment, the agrochemical composition is a water-dispersible granule, which comprises a first salt of dicamba, a second salt of 2,4-D and a cationic polyamine (B) selected from (B1.1), (B1.2), (B1.3), (B1.4), (B1.5), (B1.6), (B1.7), (B1.8), (B1.8), (B1.9), (B2.10), (B2.11), or (B2.12), MCPA as further pesticide and optionally an adjuvant. This agrochemical composition may, in another embodiment, be present in form of a water-soluble concentrate.

In a further especially preferred embodiment, the agrochemical composition is a water-dispersible granule, which comprises a first salt of dicamba, a second salt of MCPP, a cationic polyamine selected from (B1.1), (B1.2), (B1.3), (B1.4), (B1.5), (B1.6), (B1.7), (B1.8), (B1.8), (B1.9), (B2.10), (B2.11), or (B2.12), MCPA as further pesticide and optionally an adjuvant. This agrochemical composition may, in another embodiment, be present in form of a water-soluble concentrate. This agrochemical composition may, in another embodiment, be present in form of a soluble granule.

In a further especially preferred embodiment, the agrochemical composition is a water-dispersible granule, which comprises a first salt of dicamba, a second salt of MCPP, a cationic polyamine (B) selected from (B1.1), (B1.2), (B1.3), (B1.4), (B1.5), (B1.6), (B1.7), (B1.8), (B1.8), (B1.9), (B2.10), (B2.11), or (B2.12), 2,4-D as further pesticide and optionally an adjuvant. This agrochemical composition may, in another embodiment, be present in form of a water-soluble concentrate. This agrochemical composition may, in another embodiment, be present in form of a soluble granule.

The composition according to the invention comprises preferably water, wherein the first salt and the second salt are present in dissolved form in the water. Suitable examples of are the aforementioned water-soluble concentrates.

The application can be carried out before or during sowing. Methods for applying or treating agrochemical compounds and compositions thereof, respectively, on to plant propagation material, especially seeds, are known in the art, and include dressing, coating, pelleting, dusting, soaking and in-furrow application methods of the propagation material. In a preferred embodiment, the compounds or the compositions thereof, respectively, are applied on to the plant propagation material by a method such that germination is not induced, e.g. by seed dressing, pelleting, coating and dusting. In a preferred embodiment, a suspension-type (FS) composition is used for seed treatment. Typically, a FS composition may comprise 1-800 g/l of active substance, 1-200 g/l Surfactant, 0 to 200 g/l antifreezing agent, 0 to 400 g/l of binder, 0 to 200 g/l of a pigment and up to 1 liter of a solvent, preferably water.

The composition according to the invention can be used as such or in the form of their agrochemical compositions, e.g. in the form of directly sprayable solutions, powders, suspensions, dispersions, emulsions, oil dispersions, pastes, dustable products, materials for spreading, or granules, by means of spraying, atomizing, dusting, spreading, brushing, immersing or pouring. The application forms depend entirely on the intended purposes; it is intended to ensure in each case the finest possible distribution of the active substances according to the invention. Aqueous application forms can be prepared from emulsion concentrates, pastes or wettable powders (sprayable powders, oil dispersions) by adding water. To prepare emulsions, pastes or oil dispersions, the substances, as such or dissolved in an oil or solvent, can be homogenized in water by means of a wetter, tackifier, dispersant or emulsifier. Alternatively, it is possible to prepare concentrates composed of active substance, wetter, tackifier, dispersant or emulsifier and, if appropriate, solvent or oil, and such concentrates are suitable for dilution with water. The active substance concentrations in the ready-to-use preparations can be varied within relatively wide ranges. In general, they are from 0.0001 to 10%, preferably from 0.001 to 1% by weight of active substance. The active substances may also be used successfully in the ultra-low-volume process (ULV), it being possible to apply compositions comprising over 95% by weight of active substance, or even to apply the active substance without additives.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha. In treatment of plant propagation materials such as seeds, e.g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required. When used in the protection of materials or stored products, the amount of active substance applied depends on the kind of application area and on the desired effect. Amounts customarily applied in the protection of materials are, e.g., 0.001 g to 2 kg, preferably 0.005 g to 1 kg, of active substance per cubic meter of treated material.

Various types of oils, wetters, adjuvants, herbicides, bactericides, other fungicides and/or pesticides may be added to the active substances or the compositions comprising them, if appropriate not until immediately prior to use (tank mix). These agents can be admixed with the compositions according to the invention in a weight ratio of 1:100 to 100:1, preferably 1:10 to 10:1. Adjuvants which can be used are in particular organic modified polysiloxanes such as Break Thru S 240®; alcohol alkoxylates such as Atplus 245®, Atplus MBA 1303®, Plurafac LF 300® and Lutensol ON 30®; EO/PO block polymers, e.g. Pluronic RPE 2035® and Genapol B®; alcohol ethoxylates such as Lutensol XP 80®; and dioctyl sulfosuccinate sodium such as Leophen RA®.

The salts can also be present together with other active substances, e.g. with herbicides, insecticides, growth regulators, fungicides or else with fertilizers, as pre-mix or, if appropriate, not until immediately prior to use (tank mix).

The present invention also relates to a method of combating harmful insects and/or phytopathogenic fungi, which comprises contacting plants, seed, soil or habitat of plants in or on which the harmful insects and/or phytopathogenic fungi are growing or may grow, plants, seed or soil to be protected from attack or infestation by said harmful insects and/or phytopathogenic fungi with an effective amount of the composition according to the invention. The anionic pesticides comprises usually an insecticide and/or an fungicide. For example, for combating harmful insects the agrochemical formulation comprises an insecticide. For example, for combating phytopathogenic fungi the agrochemical formulation comprises a fungicide.

The present invention further relates to a method of controlling undesired vegetation, which comprises allowing a herbicidal effective amount of the composition according to the invention to act on plants, their habitat or on seed of said plants. In a preferred embodiment, the method may also include plants that have been rendered tolerant to the application of the agrochemical formulation wherein the anionic pesticide is a herbicide. The methods generally involve applying an effective amount of the agrochemical formulation of the invention comprising a selected herbicide to a cultivated area or crop field containing one or more crop plants which are tolerant to the herbicide. Although any undesired vegetation may be controlled by such methods, in some embodiments, the methods may involve first identifying undesired vegetation in an area or field as susceptible to the selected herbicide. Methods are provided for controlling the undesired vegetation in an area of cultivation, preventing the development or the appearance of undesired vegetation in an area of cultivation, producing a crop, and increasing crop safety. Undesired vegetation, in the broadest sense, is understood as meaning all those plants which grow in locations where they are undesired, which include but is not limited to plant species generally regarded as weeds.

In addition, undesired vegetation can also include undesired crop plants that are growing in an identified location. For example, a volunteer maize plant that is in a field that predominantly comprises soybean plants can be considered undesirable. Undesired plants that can be controlled by the methods of the present invention include those plants that were previously planted in a particular field in a previous season, or have been planted in an adjacent area, and include crop plants including soybean, corn, canola, cotton, sunflowers, and the like. In some aspects, the crop plants can be tolerant of herbicides, such as glyphosate, ALS-inhibitors, or glufosinate herbicides. The methods comprise planting the area of cultivation with crop plants which are tolerant to the herbicide, and in some embodiments, applying to the crop, seed, weed, undesired plant, soil, or area of cultivation thereof an effective amount of an herbicide of interest. The herbicide can be applied at any time during the cultivation of the tolerant plants. The herbicide can be applied before or after the crop is planted in the area of cultivation. Also provided are methods of controlling glyphosate tolerant weeds or crop plants in a cultivated area comprising applying an effective amount of herbicide other than glyphosate to a cultivated area having one or more plants that are tolerant to the other herbicide.

The term "herbicidal effective amount" denotes an amount of pesticidal active component, such as the salts or the further pesticide, which is sufficient for controlling undesired vegetation and which does not result in a substantial damage to the treated plants. Such an amount can vary in a broad range and is dependent on various factors, such as the species to be controlled, the treated cultivated plant or material, the climatic conditions and the specific pesticidal active component used.

The term "controlling weeds" refers to one or more of inhibiting the growth, germination, reproduction, and/or proliferation of; and/or killing, removing, destroying, or otherwise diminishing the occurrence and/or activity of a weed and/or undesired plant.

The composition according to the invention has excellent herbicidal activity against a broad spectrum of economically important monocotyledonous and dicotyledonous harmful plants, such as broad-leaved weeds, weed grasses or Cyperaceae. The active compounds also act efficiently on perennial weeds which produce shoots from rhizomes, root stocks and other perennial organs and which are difficult to control. Specific examples may be mentioned of some representatives of the monocotyledonous and dicotyledonous weed flora which can be controlled by the composition according to the invention, without the enumeration being restricted to certain species. Examples of weed species on which the herbicidal compositions act efficiently are, from amongst the monocotyledonous weed species, *Avena* spp., *Alopecurus* spp., *Apera* spp., *Brachiaria* spp., *Bromus* spp., *Digitaria* spp., *Lolium* spp., *Echinochloa* spp., *Leptochloa* spp., *Fimbristylis* spp., *Panicum* spp., *Phalaris* spp., *Poa* spp., *Setaria* spp. and also *Cyperus* species from the annual group, and, among the perennial species, *Agropyron*, *Cynodon*, *Imperata* and *Sorghum* and also perennial *Cyperus* species. In the case of the dicotyledonous weed species, the spectrum of action extends to genera such as, for example, *Abutilon* spp., *Amaranthus* spp., *Chenopodium* spp., *Chrysanthemum* spp., *Galium* spp., *Ipomoea* spp., *Kochia* spp., *Lamium* spp., *Matricaria* spp., *Pharbitis* spp., *Polygonum* spp., *Sida* spp., *Sinapis* spp., *Solanum* spp., *Stellaria* spp., *Veronica* spp. *Eclipta* spp., *Sesbania* spp., *Aeschynomene* spp. and *Viola* spp., *Xanthium* spp. among the annuals, and *Convolvulus*, *Cirsium*, *Rumex* and *Artemisia* in the case of the perennial weeds.

The present invention further relates to seed comprising the composition according to the invention. Preferably, the seed is coated with an agrochemical formulation comprising the composition according to the invention.

The present invention offers various advantages: The composition according to the invention shows a low volatility. The volatility was also reduced compared to commercially available compositions. Further on, the composition according to the invention is easily prepared starting from cheap, industrially available compounds, which are easy to handle. The pesticidal activity remains at a level equivalent to known salts or the free acid of the pesticide. The invention reduces off-target crop injury due to the reduced volatility, even without adversely affecting the pesticidal activity. The low volatility characteristics are maintained whether delivered as a tank mix or pre-mix formulation. Further on, the invention increases the physical stability of the composition, e.g. by reducing the tendency to crystallize or the tendency for phase separation. The composition according to the invention shows a high solubility in water.

The invention is further illustrated but not limited by the following examples.

EXAMPLES

Clarity®: Agrochemical formulation of dicamba salt of 2-(-aminoethoxy)ethanol (water-soluble concentrate SL, 480 g/l, commercially available from BASF Cooperation).

Touchdown® HiTech: Agrochemical formulation of glyphosate potassium salt (water-soluble concentrate SL, 500 g/l, commercially available from Syngenta).

Accord® Concentrate: Agrochemical formulation of glyphosate isopropylamine (IPA) salt (water-soluble concentrate SL, 480 g/l, pH 4.8-5.0, commercially available from Dow AgroScience).

Example 1

Preparation of Single Salts

Salts were prepared comprising dicamba or glyphosate as anionic pesticide and various polyamine cations. A known quantity of dicamba acid (3,6-dichloro-2-methoxybenzoic acid) or glyphosate acid (N-(phosphonomethyl)glycine) were suspended in water while stirring. The suspension was titrated with polyamine to a pH of 7.0 to 8.0 (for dicamba) or to a pH of about 5 (for glyphosate) until all solids were dissolved and the salts have formed. Additional water was added to adjust the desired concentration of dicamba or glyphosate. Tables 1 to 4 list the details of the final compositions. The water concentration added up to 100 wt % in each case. It was demonstrated, that all tested salts have a very good solubility in water, i.e. that dicamba salts are soluble up to at least 527 g/l and glyphosate salts are soluble up to at least 521 g/l.

TABLE 1

Solution 1 comprising 527 g/l dicamba.

|  | Concentration (w/w %) |
|---|---|
| Dicamba acid | 42.29 |
| N,N-Bis-(3-aminopropyl)methylamine (BAPMA) | 10.9 |
| Water | 46.80 |

TABLE 2

Solution 2 comprising 509 g/l dicamba.

|  | Concentration (w/w %) |
|---|---|
| Dicamba acid | 42.06 |
| Diethylenetriamine (DETA) | 9.95 |
| Water | 47.99 |

TABLE 3

Solution 3 comprising 509 g/l glyphosate.

|  | Concentration (w/w %) |
|---|---|
| Glyphosate acid | 39.68 |
| N,N-Bis-(3-aminopropyl)methylamine (BAPMA) | 15.65 |
| Water | 44.67 |

TABLE 4

Solution 4 comprising 521 g/l glyphosate.

|  | Concentration (w/w %) |
|---|---|
| Glyphosate acid | 39.68 |
| Diethylenetriamine (DETA) | 13.05 |
| Water | 47.27 |

Example 2

Preparation of Glyphosate and Dicamba Mixtures

The following mixture of glyphosate and dicamba salts (glyphosate/dicamba ratio=2:1) were prepared by mixing with agitation at room temperature.

TABLE 5

| Composition | | Concentration (w/w %) |
|---|---|---|
| A [a] | Touchdown ® HiTech (Glyphosate K salt) | 62.93 |
| | Solution 2 (Dicamba DETA salt) | 37.07 |
| B [a] | Touchdown ® HiTech (Glyphosate K salt) | 62.71 |
| | Solution 1 (Dicamba BAPMA salt) | 36.29 |
| C [a] | Touchdown ® HiTech (Glyphosate K salt) | 61.53 |
| | Clarity ® (Dicamba DGA salt) | 38.47 |
| D [a] | Accord ® Concentrate (Glyphosate IPA salt) | 67.95 |
| | Solution 2 (Dicamba DETA salt) | 32.05 |
| E [a] | Accord ® Concentrate (Glyphosate IPA salt) | 68.67 |
| | Solution 3 (Glyphosate BAPMA salt) | 31.33 |
| F [a] | Accord ® Concentrate (Glyphosate IPA salt) | 66.64 |
| | Clarity ® (Dicamba DGA salt) | 33.36 |
| G | Solution 4 (Glyphosate DETA salt) | 66.15 |
| | Solution 2 (Dicamba DETA salt) | 33.85 |
| H | Solution 3 (Glyphosate BAPMA salt) | 67.41 |
| | Solution 1 (Dicamba BAPMA salt) | 32.59 |

[a] comparative, not according to the invention.

Example 3

Stability of after Storage

The compositions A-H of Example 2 were kept at 25° C. for a month. Table 6 summarizes the visual observations of stability for the mixture formulations. It is found that the physical stability of mixture formulations of glyphosate and dicamba salts G and H (according to the invention) were stable, while other mixture formulations A to F either crystallized out of solution or phase separated.

TABLE 6

| Formulation | Observation |
|---|---|
| A [a] | Two liquid phases separated |
| B [a] | Two liquid phases separated |
| C [a] | Two liquid phases separated |
| D [a] | Crystallization |
| E [a] | Crystallization |
| F [a] | Crystallization |
| G | Stable |
| H | Stable |

[a] comparative, not according to the invention.

Example 4

Volatility Field Test

Field plots in several locations in the USA were established in an existing soybean field 300 ft apart to avoid potential movement into adjacent plots. In the center of each plot (300×300 ft), a 40×40 ft area was treated with a composition D or G from Example 2. Treatments were applied when soybeans were in the V5 to R1 growth stage. Applications were made using a hand boom equipped with air induction (AI) nozzles and boom height of 12 inch above soybean canopy height on a day with less low wind speeds to minimize particle drift.

Five minutes following application, 4 air sample pumps were placed equidistant from each other within the sprayed area. A wooden stake was used to raise air pumps approximately 0 to 3 inches above soybean canopy height. Air samples were collected for 18 hrs, depending on location, by pumping 4 L/min of air through a sampling cassette packed with a sorbent filter. The sampling cassette consisted of a 1.0 µm glass fiber filter and mixed ester cellulose support pad in a plastic cassette connected by tygon tubing to the low volume pump. Air samples were collected for 18 hrs continuously following application. Immediately following removal of the cassettes from the air pump, all openings on the cassette were closed and each cassette was placed in a separate ziplock bag, and shipped on dry ice.

The filter and support pads of the cassettes were extracted by 0.5 N KOH and 10% KCl by heating to 60° C. in a water bath for 15 minutes. A 1 mL aliquot was acidified with HCl to pH 1-2, then partitioned with 4 mL of ethyl acetate by vortexing and followed by centrifuging. Two mL of the ethyl acetate phase was then evaporated under nitrogen. The samples were then reconstituted in 2 mL of 10/90 MeOH/$H_2O$ and analysed on an LC/MS/MS.

The DGA-dicamba volatility as measured by dicamba concentration ($ng/m^3$) in the air above treated soybean plants is summarized in Table 7. The volatility of dicamba was greatly reduced with Composition G according to the invention compared to Composition D.

TABLE 7

| Volatility of dicamba (all values in $ng/m^3$) | | | | |
|---|---|---|---|---|
| Location | TX | NC | GA | Mean |
| Composition D (Glyphosate IPA salt + Dicamba DETA salt) [a] | 72 | 168 | 346 | 195 |
| Composition G (Glyphosate DETA salt + Dicamba DETA salt) | — | 34 | 43 | 38 |

[a] comparative, not according to the invention.

Example 5

Greenhouse Trial

A greenhouse trial was conducted to confirm high pesticidal activity (biological efficacy). Non-glyphosate tolerant corn (*Zea mays*), glyphosate-tolerant soybean (*Glycine max*), common lambsquarters (*Chenopodium album*), velvetleaf (*Abutilon theophrasti*), spring wheat (*Triticum aestivum*), and mixed morningglory species (*Ipomoea* spp.) were included for evaluation. Plant growth stages ranged from 2 to 5 leaves, depending on the target species.

Both dicamba+glyphosate treatments were applied at 280+560 g ai/ha, respectively, with an enclosed track sprayer delivering 187 l/ha. Non-ionic surfactant at 0.25% (v/v) was included with all treatments. Control was evaluated on a zero (no control) to 100 (complete plant death) percent scale at 14 days after treatment. The averaged values were summarized in Table 8. Both herbicide treatments showed high pesticidal activity (biological efficacy) for all species.

TABLE 8

| | Efficacy [values from zero (no control) to 100 (complete plant death)] | |
|---|---|---|
| | Glyphosate BAPMA salt + Dicamba BAPMA salt | Glyphosate DETA salt + Dicamba DETA salt |
| Zea mays | 94 | 95 |
| Glycine max | 95 | 98 |
| Triticum aestivum | 96 | 95 |
| Abutilon theophrasti | 95 | 91 |
| Chenopodium album | 100 | 100 |
| Ipomoea spp. | 96 | 98 |

We claim:

1. An aqueous stable pesticidal composition consisting essentially of:
   a) a first salt, which contains a first anionic pesticide (A1) and a cationic polyamine (B),
   b) a second salt, which contains a second anionic pesticide (A2) and a cationic polyamine (B), and
   c) water,
   wherein the first salt and the second salt are present in dissolved form in the water,
   wherein the anionic pesticides and the polyamine are combined in such a molar ratio which results in a pH of 6.5 to 9.0,
   wherein the first and the second anionic pesticides are selected from the group consisting of dicamba and glyphosate;
   wherein the first anionic pesticide and the second anionic pesticide are different anionic pesticides;
   wherein both salts contain the same cationic polyamine (B), and wherein the cationic polyamine comprises at least two amino groups, and
   wherein the cationic polyamine (B) is selected from the group consisting of a compound of formula (B1.1) and a compound of the formula (B1.2):

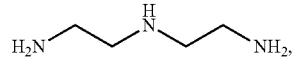
(B1.1)

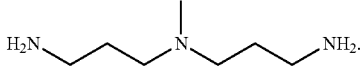
(B1.2)

2. The composition of claim 1, wherein the molar ratio of the sum of the first and the second anionic pesticide to the sum of the cationic polyamines is in the range from 1.5 : 1 to 4 : 1.

3. A method for preparing the composition of claim 1, comprising mixing the first salt and the second salt.

4. A method of combating harmful insects and/or phytopathogenic fungi, which comprises contacting plants, seed, soil or habitat of plants in or on which the harmful insects and/or phytopathogenic fungi are growing or may grow, plants, seed or soil to be protected from attack or infestation by said harmful insects and/or phytopathogenic fungi with an effective amount of the composition of claim 1.

5. The method of claim 4, wherein the cationic polyamine is a compound of formula (B1.1):

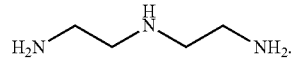
(B1.1)

6. A method of controlling undesired vegetation, which comprises applying a herbicidal effective amount of the composition of claim 1 to plants, habitat or on seed of said plants.

7. A seed treated with the composition of claim 1.

8. The composition of claim 1, wherein the cationic polyamine is the compound of formula (B1.1).

9. The composition of claim 1, wherein the cationic polyamine is the compound of formula (B1.2).

* * * * *